United States Patent
Xue et al.

(10) Patent No.: US 11,356,232 B2
(45) Date of Patent: Jun. 7, 2022

(54) BWP DEACTIVATION METHOD, DEVICE, AND SYSTEM

(71) Applicant: Huawei Technologies Co., Ltd., Shenzhen (CN)

(72) Inventors: Yifan Xue, Beijing (CN); Da Wang, Shenzhen (CN); Yun Liu, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 16/961,601

(22) PCT Filed: Jan. 10, 2019

(86) PCT No.: PCT/CN2019/071129
§ 371 (c)(1),
(2) Date: Jul. 10, 2020

(87) PCT Pub. No.: WO2019/137418
PCT Pub. Date: Jul. 18, 2019

(65) Prior Publication Data
US 2021/0119759 A1  Apr. 22, 2021

(30) Foreign Application Priority Data

Jan. 11, 2018  (CN) .......................... 201810027290.7

(51) Int. Cl.
*H04L 5/00* (2006.01)
*H04W 72/04* (2009.01)

(52) U.S. Cl.
CPC .......... *H04L 5/0098* (2013.01); *H04L 5/0092* (2013.01); *H04W 72/042* (2013.01); *H04W 72/0453* (2013.01); *H04W 72/0493* (2013.01)

(58) Field of Classification Search
CPC .............. H04L 5/0098; H04W 72/042; H04W 72/0453; H04W 72/0493
See application file for complete search history.

(56) References Cited

U.S. PATENT DOCUMENTS

2016/0261661 A1  9/2016  Taibi et al.
2017/0279646 A1*  9/2017  Yi .......................... H04L 5/0053
(Continued)

FOREIGN PATENT DOCUMENTS

| CN | 104349466 A | 2/2015 |
| CN | 104486826 A | 4/2015 |

(Continued)

OTHER PUBLICATIONS

R1-1719301, MCC Support, "Final Report of 3GPP TSG RAN WG1 #90bis v1.0.0 (Prague, Czech Rep, Oct. 9-13, 2017)," 3GPP TSG RAN WG1 Meeting #91, Reno, USA, Nov. 27-Dec. 1, 2017, 206 pages.

(Continued)

*Primary Examiner* — Jael M Ulysse
(74) *Attorney, Agent, or Firm* — Conley Rose, P.C.

(57) ABSTRACT

Embodiments of this application disclose a BWP deactivation method, a device, and a system, to deactivate one or more BWPs in a plurality of active BWPs of a first device. The method includes: receiving, by the first device, signaling sent by a second device; and deactivating, by the first device, a BWP of the first device based on the signaling. Technical solutions provided in the embodiments of this application are applicable to BWP deactivation.

20 Claims, 12 Drawing Sheets

(56) References Cited

U.S. PATENT DOCUMENTS

| | | | | |
|---|---|---|---|---|
| 2018/0288746 | A1* | 10/2018 | Zhang | H04L 5/0048 |
| 2019/0044811 | A1* | 2/2019 | Miao | H04W 72/0453 |
| 2019/0103954 | A1* | 4/2019 | Lee | H04L 5/001 |
| 2019/0124558 | A1* | 4/2019 | Ang | H04W 24/02 |
| 2019/0132109 | A1* | 5/2019 | Zhou | H04L 5/001 |
| 2019/0132845 | A1* | 5/2019 | Babaei | H04L 1/1812 |
| 2019/0132862 | A1* | 5/2019 | Jeon | H04L 5/0064 |
| 2019/0207662 | A1* | 7/2019 | Zhou | H04L 5/0048 |
| 2019/0260530 | A1* | 8/2019 | Yi | H04L 5/0094 |
| 2020/0280423 | A1* | 9/2020 | Tang | H04L 5/0098 |
| 2020/0403763 | A1* | 12/2020 | Takeda | H04W 72/1284 |
| 2021/0075581 | A1* | 3/2021 | Takeda | H04W 72/042 |

FOREIGN PATENT DOCUMENTS

| | | |
|---|---|---|
| EP | 3661095 A1 | 6/2020 |
| WO | 2015015285 A2 | 2/2015 |
| WO | 2017188870 A1 | 11/2017 |

OTHER PUBLICATIONS

Jeon, J., et al., "NR Wide Bandwidth Operations," Final manuscript to IEEE Communications Magazine on Key Technologies for 5G New Radio, initial submission on Aug. 1, 2017, Revised on Dec. 14, 2017, and accepted on Dec. 18, 2017, 11 pages.

R1-17Xxxxx, MediaTek Inc., "Summary of Offline Discussion on Bandwidth Part Operation," 3GPP TSG RAN WG1 Meeting 90bis, Prague, CZ, Oct. 9-13, 2017, 13 pages.

R1-1712870, VIVO, "Discussion on the activation/deactivation of the bandwidth part," 3GPP TSG RAN WG1 Meeting#90, Prague, Czech Republic, Aug. 21-25, 2017, 3 pages.

R1-1713964, NTT Docomo, Inc., "Remaing issues on bandwidth parts for NR," 3GPP TSG RAN WG1 Meeting #90, Prague, Czech Republic, Aug. 21-25, 2017, 5 pages.

R1-1715648, VIVO, "Remaining details for bandwidth part operation," 3GPP TSG RAN WG1 NR AH#3, Nagoya, Japan, Sep. 18-21, 2017, 3 pages.

Samsung, "RAN2 consideration for bandwidth part in NR," 3GPP TSG-RAN WG2 NR Ad-hoc#2 Meeting, R2-1706427, Qingdao, China, Jun. 27-29, 2017, 5 pages.

Samsung, "Activation/deactivation of bandwidth parts in NR," 3GPP TSG-RAN WG2 NR #99bis Meeting, R2-1711189, Prague, Czech, Oct. 9-13, 2017, 5 pages.

Huawei, et al., "Bandwidth part activation and adaptation," 3GPP TSG RAN WG1 Meeting #91, R1-1719828, Reno, USA, Nov. 27-Dec. 1, 2017, 6 pages.

* cited by examiner

BWP DEACTIVATION METHOD, DEVICE, AND SYSTEM

CROSS-REFERENCE TO RELATED APPLICATIONS

This application is a national stage of International Patent Application No. PCT/CN2019/071129, filed on Jan. 10, 2019, which claims priority to Chinese Patent Application No. 201810027290.7, filed on Jan. 11, 2018. Both of the aforementioned applications are hereby incorporated by reference in their entireties.

TECHNICAL FIELD

Embodiments of this application relate to the field of communications technologies, and in particular, to a bandwidth part (Bandwidth Part, BWP) status deactivation method, a device, and a system.

BACKGROUND

The fifth generation (5th-Generation, 5G) new radio (New Radio, NR) protocol proposes a concept of a bandwidth part (Bandwidth part, BWP), and a network device and a terminal device can communicate with each other on an active BWP. In the NR protocol version, the terminal device can simultaneously support a plurality of active BWPs. For example, a new BWP may be scheduled by using data scheduling downlink control information (scheduling Downlink Control Information, scheduling DCI). After receiving the scheduling DCI used to schedule the new BWP, the terminal device activates only the new BWP, and keeps an original BWP in an active state. In this way, there are a plurality of active BWPs for the terminal device. For example, the terminal device originally operates on a BWP0. When the terminal device receives scheduling DCI and the scheduling DC is used to schedule data on a BWP1, the terminal device activates only the BWP1, and keeps the BWP0 still in an active state, to ensure that both the BWP0 and the BWP1 are in an active (active) state.

However, as an operating time of the terminal device increases, there may be an increasing quantity of BWPs activated by the terminal device. To improve an energy saving effect of the terminal device, the terminal device may deactivate some of the active BWPs, to achieve the energy saving effect of the terminal device. Therefore, when there are a plurality of BWPs for the terminal device, how a BWP is deactivated becomes an issue to be urgently resolved.

SUMMARY

Embodiments of this application provide a BWP deactivation method, a device, and a system, to deactivate a BWP.

To achieve the foregoing objective, the following technical solutions are used in the embodiments of this application.

According to a first aspect, an embodiment of this application provides a BWP deactivation method. The method includes: receiving, by a first device, signaling sent by a second device, and deactivating, by the first device, a BWP of the first device based on the received signaling.

The first device can support a plurality of active BWPs, and a BWP of the first device that is deactivated by the first device may be one or more BWPs in the plurality of active BWPs of the first device that are deactivated by the first device.

Based on the foregoing solution, the first device may deactivate the BWP based on the signaling delivered by the second device, to deactivate some of the plurality of active BWPs, thereby improving an energy saving effect of the first device.

With reference to the first aspect, in a first possible implementation of the first aspect, the signaling includes first indication information, and the first indication information is used to instruct whether to deactivate a BWP; and when the first indication information instructs to deactivate a BWP, the first device deactivates a BWP on which the signaling is located. In this possible implementation, the signaling may be data scheduling DCI.

In this way, the indication information that is used to instruct to deactivate a BWP and that is carried in the signaling can be used to deactivate the BWP. Therefore, it is simple and convenient.

With reference to the first possible implementation of the first aspect, in a second possible implementation of the first aspect, the signaling further includes second indication information, and the second indication information is used to indicate a first BWP for data transmission; and the method further includes: when the first BWP is the BWP on which the signaling is located, before the deactivating, by the first device, a BWP on which the signaling is located, transmitting, by the first device, data on the first BWP; or when the first BWP is not the BWP on which the signaling is located, activating, by the first device, the first BWP, and deactivating the BWP on which the signaling is located. In this way, BWP skipping (switching) is implemented.

In this way, data transmission can be completed before deactivation of the BWP currently used by the first device, thereby ensuring data transmission continuity.

With reference to the first aspect, in a third possible implementation of the first aspect, the signaling includes third indication information and fourth indication information, the third indication information is used to indicate that the signaling is signaling instructing to deactivate a BWP, and the fourth indication information indicates at least one BWP; and the method includes: deactivating, by the first device based on the fourth indication information, the at least one BWP indicated by the fourth indication information.

The signaling in this possible implementation is different from the data scheduling DCI, and may be DCI for the purpose other than data scheduling. In this way, a signaling format for specially instructing to deactivate a BWP can be used to deactivate the BWP, to deactivate one or more BWPs.

With reference to the first aspect, in a fourth possible implementation of the first aspect, the method includes: deactivating, by the first device, the BWP of the first device based on a resource location occupied by the signaling.

The resource location occupied by the signaling is a location of a control resource set in which the signaling is located or a location of search space in which the signaling is located, and the resource location occupied by the signaling has a correspondence with whether to deactivate a BWP. The correspondence may be configured by the second device for the first device, or may be specified by a protocol, that is, may be hardcoded.

Specifically, after the first device receives the signaling on a first resource location, if the first resource location is corresponding to BWP deactivation, the first device deactivates the BWP on which the signaling is located.

In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the first aspect, in a fifth possible implementation of the first aspect, the method includes: deactivating, by the first device, the BWP of the first device based on the signaling and a capability of the first device.

The signaling includes fifth indication information, and the fifth indication information is used to instruct to activate a second BWP of the first device. The capability of the first device includes a maximum quantity of BWPs supported by the first device or a maximum bandwidth supported by the first device.

The deactivating, by the first device, the BWP of the first device based on the signaling and a capability of the first device includes: activating, by the first device, the second BWP based on the fifth indication information; and when a capability of all active BWPs of the first device is beyond the capability supported by the first device, deactivating, by the first device, at least one BWP in the active BWPs of the first device other than the second BWP.

Alternatively, before the first device activates the second BWP based on the fifth indication information, when the first device determines that the capability of the current active BWPs of the first device exactly reaches the capability of the first device, the capability of the active BWPs of the first device is beyond the capability of the first device if the second BWP is activated; and the first device does not activate the second BWP based on the fifth indication information. In this case, the first device sends an activation failure message to the second device, where the activation failure message is used to notify the second device that the second BWP is not activated.

The first device deactivates the at least one BWP in the active BWPs of the first device other than the second BWP based on at least one type of the following information: activation time of the active BWPs of the first device, priorities of the active BWPs of the first device, bandwidth values of the active BWPs of the first device, index numbers of the active BWPs of the first device, and frequency spacings between the active BWPs of the first device and the second BWP. Specifically, the first device may receive configuration information delivered by the second device, and deactivate a BWP based on the configuration information. The configuration information is used to instruct the first device to deactivate the at least one BWP in the active BWPs of the first device other than the second BWP based on some of the following specific information: the activation time of the active BWPs of the first device, the priorities of the active BWPs of the first device, the bandwidth values of the active BWPs of the first device, the index numbers of the active BWPs of the first device, and the frequency spacings between the active BWPs of the first device and the second BWP.

In this way, the first device can deactivate the BWP based on the received signaling and the capability of the first device, to improve adaptivity of BWP deactivation.

According to a second aspect, an embodiment of this application provides a first device, where the first device includes:

a receiving unit, configured to receive signaling sent by a second device; and a deactivation unit, configured to deactivate a BWP of the first device based on the received signaling.

Based on the foregoing solution, the first device may deactivate the BWP based on the signaling delivered by the second device, to deactivate some of a plurality of active BWPs, thereby improving an energy saving effect of the first device.

With reference to the second aspect, in a first possible implementation of the second aspect, the signaling includes first indication information, and the first indication information is used to instruct whether to deactivate a BWP; and the deactivation unit is specifically configured to: when the first indication information instructs to deactivate a BWP, deactivate a BWP on which the signaling is located. In this possible implementation, the signaling may be data scheduling DCI.

In this way, the indication information that is used to instruct to deactivate a BWP and that is carried in the signaling can be used to deactivate the BWP. Therefore, it is simple and convenient.

With reference to the first possible implementation of the second aspect, in a second possible implementation of the second aspect, the signaling further includes second indication information, and the second indication information is used to indicate a first BWP for data transmission; and the deactivation unit is further configured to: when the first BWP is the BWP on which the signaling is located, before the deactivation unit deactivates the BWP on which the signaling is located, transmit data on the first BWP by using the receiving unit; or when the first BWP is not the BWP on which the signaling is located, activate, for the first device, the first BWP, and deactivate the BWP on which the signaling is located. In this way, BWP skipping (switching) is implemented.

In this way, data transmission can be completed before deactivation of the BWP currently used by the first device, thereby ensuring data transmission continuity.

With reference to the second aspect, in a third possible implementation of the second aspect, the signaling includes third indication information and fourth indication information, the third indication information is used to indicate that the signaling is signaling instructing to deactivate a BWP, and the fourth indication information indicates at least one BWP; and the deactivation unit is specifically configured to deactivate, based on the fourth indication information, the at least one BWP indicated by the fourth indication information.

The signaling in this possible implementation is different from the data scheduling DCI, and may be DCI for the purpose other than data scheduling. In this way, a signaling format for specially instructing to deactivate a BWP can be used to deactivate the BWP, to deactivate one or more BWPs.

With reference to the second aspect, in a fourth possible implementation of the second aspect, the deactivation unit is specifically configured to deactivate the BWP of the first device based on a resource location occupied by the signaling.

The resource location occupied by the signaling is a location of a control resource set in which the signaling is located or a location of search space in which the signaling is located, and the resource location occupied by the signaling has a correspondence with whether to deactivate a BWP. The correspondence may be configured by the second device for the first device, or may be specified by a protocol, that is, may be hardcoded.

Specifically, the receiving unit is configured to receive the signaling at a first resource location; and the deactivation unit is configured to: when the first resource location is corresponding to BWP deactivation, deactivate a BWP on which the signaling is located.

In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the second aspect, in a fifth possible implementation of the second aspect, the deactivation unit is specifically configured to deactivate the BWP of the first device based on the signaling and a capability of the first device.

The capability of the first device includes a maximum quantity of BWPs supported by the first device or a maximum bandwidth supported by the first device. The signaling includes fifth indication information, and the fifth indication information is used to instruct to activate a second BWP of the first device.

That the deactivation unit is specifically configured to deactivate the BWP of the first device based on the signaling and a capability of the first device includes the following cases.

The deactivation unit is configured to: activate the second BWP based on the fifth indication information; and when a capability of all active BWPs of the first device is beyond the capability supported by the first device, deactivate at least one BWP in the active BWPs of the first device other than the second BWP.

Alternatively, before the deactivation unit activates the second BWP based on the fifth indication information, when the deactivation unit determines that the capability of the current active BWPs of the first device exactly reaches the capability of the first device, the capability of the active BWPs of the first device is beyond the capability of the first device if the second BWP is activated; and the deactivation unit does not activate the second BWP based on the fifth indication information. In this case, the deactivation unit is further configured to send an activation failure message to the second device by using a sending unit, where the activation failure message is used to notify the second device that the second BWP is not activated.

Specifically, the deactivation unit is configured to deactivate the at least one BWP in the active BWPs of the first device other than the second BWP based on at least one type of the following information: activation time of the active BWPs of the first device, priorities of the active BWPs of the first device, bandwidth values of the active BWPs of the first device, index numbers of the active BWPs of the first device, and frequency spacings between the active BWPs of the first device and the second BWP.

In this way, the first device can deactivate the BWP based on the received signaling and the capability of the first device, to improve adaptivity of BWP deactivation.

According to a third aspect, an embodiment of this application provides a first device. The first device can implement functions performed by the first device in the foregoing aspect. The functions may be implemented by using hardware, or may be implemented by hardware executing corresponding software. The hardware or the software includes one or more modules corresponding to the foregoing function.

In a possible design, a structure of the first device includes a processor, a receiver, and a transmitter. The processor is configured to support the first device in performing corresponding functions in the foregoing method. The receiver is configured to support the first device in receiving data or information sent by another network element. The transmitter is configured to send an instruction or information to another network element. The first device may further include a memory, and the memory is configured to be coupled to the processor and stores a program instruction and data that are necessary for the first device. For example, the receiver is configured to receive signaling sent by a second device; and the processor is configured to deactivate a BWP of the first device based on the received signaling.

Based on the foregoing solution, the first device may deactivate the BWP based on the signaling delivered by the second device, to deactivate some of a plurality of active BWPs, thereby improving an energy saving effect of the first device.

With reference to the third aspect, in a first possible implementation of the third aspect, the signaling includes first indication information, and the first indication information is used to instruct whether to deactivate a BWP; and the processor is specifically configured to: when the first indication information instructs to deactivate a BWP, deactivate a BWP on which the signaling is located. In this possible implementation, the signaling may be data scheduling DCI.

In this way, the indication information that is used to instruct to deactivate a BWP and that is carried in the signaling can be used to deactivate the BWP. Therefore, it is simple and convenient.

With reference to the first possible implementation of the third aspect, in a second possible implementation of the third aspect, the signaling further includes second indication information, and the second indication information is used to indicate a first BWP for data transmission; and the processor is further configured to: when the first BWP is the BWP on which the signaling is located, before the processor deactivates the BWP on which the signaling is located, transmit data on the first BWP by using the receiver; or when the first BWP is not the BWP on which the signaling is located, activate, for the first device, the first BWP, and deactivate the BWP on which the signaling is located. In this way, BWP skipping (switching) is implemented.

In this way, data transmission can be completed before deactivation of the BWP currently used by the first device, thereby ensuring data transmission continuity.

With reference to the third aspect, in a third possible implementation of the third aspect, the signaling includes third indication information and fourth indication information, the third indication information is used to indicate that the signaling is signaling instructing to deactivate a BWP, and the fourth indication information indicates at least one BWP; and the processor is specifically configured to deactivate, based on the fourth indication information, the at least one BWP indicated by the fourth indication information.

The signaling in this possible implementation is different from the data scheduling DCI, and may be DCI for the purpose other than data scheduling. In this way, a signaling format for specially instructing to deactivate a BWP can be used to deactivate the BWP, to deactivate one or more BWPs.

With reference to the third aspect, in a fourth possible implementation of the third aspect, the processor is specifically configured to deactivate the BWP of the first device based on a resource location occupied by the signaling.

The resource location occupied by the signaling is a location of a control resource set in which the signaling is located or a location of search space in which the signaling is located, and the resource location occupied by the signaling has a correspondence with whether to deactivate a BWP. The correspondence may be configured by the second device for the first device, or may be specified by a protocol, that is, may be hardcoded.

Specifically, the receiver is configured to receive the signaling at a first resource location; and the processor is configured to: when the first resource location is corresponding to BWP deactivation, deactivate a BWP on which the signaling is located.

In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the third aspect, in a fifth possible implementation of the third aspect, the processor is specifically configured to deactivate the BWP of the first device based on the signaling and a capability of the first device.

The capability of the first device includes a maximum quantity of BWPs supported by the first device or a maximum bandwidth supported by the first device. The signaling includes fifth indication information, and the fifth indication information is used to instruct to activate a second BWP of the first device.

That the processor is specifically configured to deactivate the BWP of the first device based on the signaling and a capability of the first device includes the following cases.

The processor is configured to: activate the second BWP based on the fifth indication information; and when a capability of all active BWPs of the first device is beyond the capability supported by the first device, deactivate at least one BWP in the active BWPs of the first device other than the second BWP.

Alternatively, before the processor activates the second BWP based on the fifth indication information, when the processor determines that the capability of the current active BWPs of the first device exactly reaches the capability of the first device, the capability of the active BWPs of the first device is beyond the capability of the first device if the second BWP is activated; and the processor does not activate the second BWP based on the fifth indication information. In this case, the processor is further configured to send an activation failure message to the second device by using the transmitter, where the activation failure message is used to notify the second device that the second BWP is not activated.

Specifically, the processor is configured to deactivate the at least one BWP in the active BWPs of the first device other than the second BWP based on at least one type of the following information: activation time of the active BWPs of the first device, priorities of the active BWPs of the first device, bandwidth values of the active BWPs of the first device, index numbers of the active BWPs of the first device, and frequency spacings between the active BWPs of the first device and the second BWP.

In this way, the first device can deactivate the BWP based on the received signaling and the capability of the first device, to improve adaptivity of BWP deactivation.

According to a fourth aspect, an embodiment of this application provides a computer storage medium. The computer storage medium is in a form of a chip and is configured to store a computer software instruction used by the foregoing first device, and the computer software instruction includes a program for performing the solution described in the first aspect.

According to a fifth aspect, an embodiment of this application provides a communications apparatus, including at least one processor and a memory, where the memory is configured to store a computer program, so that when the computer program is executed by the at least one processor, the solution described in the first aspect is implemented.

According to a sixth aspect, an embodiment of this application provides a BWP deactivation method. The method includes: configuring, by a second device, at least one BWP for a first device; and sending, by the second device, signaling to the first device, where the signaling is used to instruct the first device to deactivate a BWP of the first device based on the signaling. In this method, the first device simultaneously supports a plurality of BWPs in active states.

Based on the foregoing solution, the second device sends the signaling to the first device, so that the first device deactivates the BWP based on the signaling, to deactivate some of the plurality of active BWPs, thereby improving an energy saving effect of the first device.

With reference to the sixth aspect, in a first possible implementation of the sixth aspect, the signaling includes first indication information, and the first indication information is used to instruct whether to deactivate a BWP.

In this way, the indication information that is used to instruct to deactivate a BWP can be added to the signaling, to instruct to deactivate the BWP. Therefore, it is simple and convenient.

With reference to the first possible implementation of the sixth aspect, in a second possible implementation of the sixth aspect, the signaling further includes second indication information, and the second indication information is used to indicate a first BWP for data transmission.

In this way, the data scheduling signaling can be used to carry the indication information used to instruct to deactivate a BWP, and an existing data scheduling signaling format is used. This improves signaling compatibility.

With reference to the sixth aspect, in a third possible implementation of the sixth aspect, the signaling includes third indication information and fourth indication information, the third indication information is used to indicate that the signaling is signaling instructing to deactivate a BWP, and the fourth indication information indicates at least one BWP.

The signaling in this possible implementation is different from the data scheduling DCI, and may be DCI for the purpose other than data scheduling. In this way, a signaling format for specially instructing to deactivate a BWP can be defined to instruct to deactivate the BWP, to deactivate one or more BWPs.

With reference to the sixth aspect, in a fourth possible implementation of the sixth aspect, the method includes: sending, by the second device, the signaling at a first resource location, where the first resource location is a location of a control resource set in which the signaling is located or a location of search space in which the signaling is located, and the first resource location is corresponding to BWP deactivation.

In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the sixth aspect, in a fifth possible implementation of the sixth aspect, the method includes: sending, by the second device, configuration information to the first device, where the configuration information is used to instruct the first device to deactivate the at least one BWP in active BWPs of the first device other than a second BWP based on at least one type of the following information:

activation time of the active BWPs of the first device, priorities of the active BWPs of the first device, bandwidth values of the active BWPs of the first device, index numbers of the active BWPs of the first device, and frequency spacings between the active BWPs of the first device and the second BWP.

In this way, the first device can deactivate the BWP based on the configuration information delivered by the second device, to improve adaptivity of BWP deactivation.

With reference to the sixth aspect, in a sixth possible implementation of the sixth aspect, the method further includes:

receiving, by the second device, an activation failure message sent by the first device, where the activation failure message is used to notify the second device that the second BWP is not activated. In this way, an inactive state of the BWP can be kept between the first device and the second device.

According to a seventh aspect, an embodiment of this application provides a second device, where the second device includes:

a configuration unit, configured to configure at least one BWP for a first device; and a sending unit, configured to send signaling to the first device, where the signaling is used to instruct the first device to deactivate a BWP of the first device based on the signaling.

Based on the foregoing solution, the second device sends the signaling to the first device, so that the first device deactivates the BWP based on the signaling, to deactivate some of a plurality of active BWPs, thereby improving an energy saving effect of the first device.

With reference to the seventh aspect, in a first possible implementation of the seventh aspect, the signaling includes first indication information, and the first indication information is used to instruct whether to deactivate a BWP.

In this way, the indication information that is used to instruct to deactivate a BWP can be added to the signaling, to instruct to deactivate the BWP. Therefore, it is simple and convenient.

With reference to the first possible implementation of the seventh aspect, in a second possible implementation of the seventh aspect, the signaling further includes second indication information, and the second indication information is used to indicate a first BWP for data transmission.

In this way, the data scheduling signaling can be used to carry the indication information used to instruct to deactivate a BWP, and an existing data scheduling signaling format is used. This improves signaling compatibility.

With reference to the seventh aspect, in a third possible implementation of the seventh aspect, the signaling includes third indication information and fourth indication information, the third indication information is used to indicate that the signaling is signaling instructing to deactivate a BWP, and the fourth indication information indicates at least one BWP.

The signaling in this possible implementation is different from the data scheduling DCI, and may be DCI for the purpose other than data scheduling. In this way, a signaling format for specially instructing to deactivate a BWP can be defined to instruct to deactivate the BWP, to deactivate one or more BWPs.

With reference to the seventh aspect, in a fourth possible implementation of the seventh aspect, the second device sends the signaling at a first resource location, where the first resource location is a location of a control resource set in which the signaling is located or a location of search space in which the signaling is located, and the first resource location is corresponding to BWP deactivation.

In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the seventh aspect, in a fifth possible implementation of the seventh aspect, the transmitter is further configured to send configuration information to the first device, where the configuration information is used to instruct the first device to deactivate the at least one BWP in active BWPs of the first device other than a second BWP based on at least one type of the following information: activation time of the active BWPs of the first device, priorities of the active BWPs of the first device, bandwidth values of the active BWPs of the first device, index numbers of the active BWPs of the first device, and frequency spacings between the active BWPs of the first device and the second BWP. In this way, the first device can deactivate the BWP based on the configuration information delivered by the second device, to improve adaptivity of BWP deactivation.

With reference to the seventh aspect, in a sixth possible implementation of the seventh aspect, the second device further includes:

a receiving unit, configured to receive an activation failure message sent by the first device, where the activation failure message is used to notify the second device that the second BWP is not activated. In this way, an inactive state of the BWP can be kept between the first device and the second device.

According to an eighth aspect, an embodiment of this application provides a second device. The second device can implement functions performed by the second device in the foregoing aspect. The functions may be implemented by using hardware, or may be implemented by hardware executing corresponding software. The hardware or the software includes one or more modules corresponding to the foregoing function.

In a possible design, a structure of the second device includes a processor, a receiver, and a transmitter. The processor is configured to support the second device in performing corresponding functions in the foregoing method. The receiver is configured to support the second device in receiving data or information sent by another network element. The transmitter is configured to send an instruction or information to another network element. The second device may further include a memory, and the memory is configured to be coupled to the processor and stores a program instruction and data that are necessary for the second device. For example, the processor is configured to configure at least one BWP for a first device; and the transmitter is configured to send signaling to the first device.

Based on the foregoing solution, the second device sends the signaling to the first device, so that the first device deactivates a BWP based on the signaling, to deactivate some of a plurality of active BWPs, thereby improving an energy saving effect of the first device.

With reference to the eighth aspect, in a first possible implementation of the eighth aspect, the signaling includes first indication information, and the first indication information is used to instruct whether to deactivate a BWP. In this way, the indication information that is used to instruct to deactivate a BWP can be added to the signaling, to instruct to deactivate the BWP. Therefore, it is simple and convenient.

With reference to the first possible implementation of the eighth aspect, in a second possible implementation of the eighth aspect, the signaling further includes second indication information, and the second indication information is used to indicate a first BWP for data transmission. In this way, the data scheduling signaling can be used to carry the indication information used to instruct to deactivate a BWP, and an existing data scheduling signaling format is used. This improves signaling compatibility.

With reference to the eighth aspect, in a third possible implementation of the eighth aspect, the signaling includes third indication information and fourth indication information, the third indication information is used to indicate that the signaling is signaling instructing to deactivate a BWP, and the fourth indication information indicates at least one BWP.

The signaling in this possible implementation is different from the data scheduling DCI, and may be DCI for the purpose other than data scheduling. In this way, a signaling format for specially instructing to deactivate a BWP can be defined to instruct to deactivate the BWP, to deactivate one or more BWPs.

With reference to the eighth aspect, in a fourth possible implementation of the eighth aspect, the second device sends the signaling at a first resource location, where the first resource location is a location of a control resource set in which the signaling is located or a location of search space in which the signaling is located, and the first resource location is corresponding to BWP deactivation. In this way, the BWP can be deactivated by using an implicit instruction of the resource location occupied by the signaling, without the need of using the indication information carried in the signaling. This reduces redundancy of carrying the information by the signaling, and improves signaling transmission efficiency.

With reference to the eighth aspect, in a fifth possible implementation of the eighth aspect, the transmitter is further configured to send configuration information to the first device, where the configuration information is used to instruct the first device to deactivate the at least one BWP in active BWPs of the first device other than a second BWP based on at least one type of the following information: activation time of the active BWPs of the first device, priorities of the active BWPs of the first device, bandwidth values of the active BWPs of the first device, index numbers of the active BWPs of the first device, and frequency spacings between the active BWPs of the first device and the second BWP. In this way, the first device can deactivate the BWP based on the configuration information delivered by the second device, to improve adaptivity of BWP deactivation.

With reference to the eighth aspect, in a sixth possible implementation of the eighth aspect, the transmitter is configured to receive an activation failure message sent by the first device, where the activation failure message is used to notify the second device that the second BWP is not activated. In this way, an inactive state of the BWP can be kept between the first device and the second device.

According to a ninth aspect, an embodiment of this application provides a computer storage medium. The computer storage medium is in a form of a chip and is configured to store a computer software instruction used by the foregoing second device, and the computer software instruction includes a program for performing the solution described in the sixth aspect.

According to a tenth aspect, an embodiment of this application provides a communications apparatus, including at least one processor and a memory, where the memory is configured to store a computer program, so that when the computer program is executed by the at least one processor, the solution described in the sixth aspect is implemented.

According to an eleventh aspect, an embodiment of this application provides a BWP deactivation system, including the first device according to any aspect of the second aspect to the sixth aspect and the second device according to any aspect of the seventh aspect to a twelfth aspect.

DESCRIPTION OF EMBODIMENTS

The following describes the implementations of the embodiments of this application in detail with reference to accompanying drawings.

Figure 1:
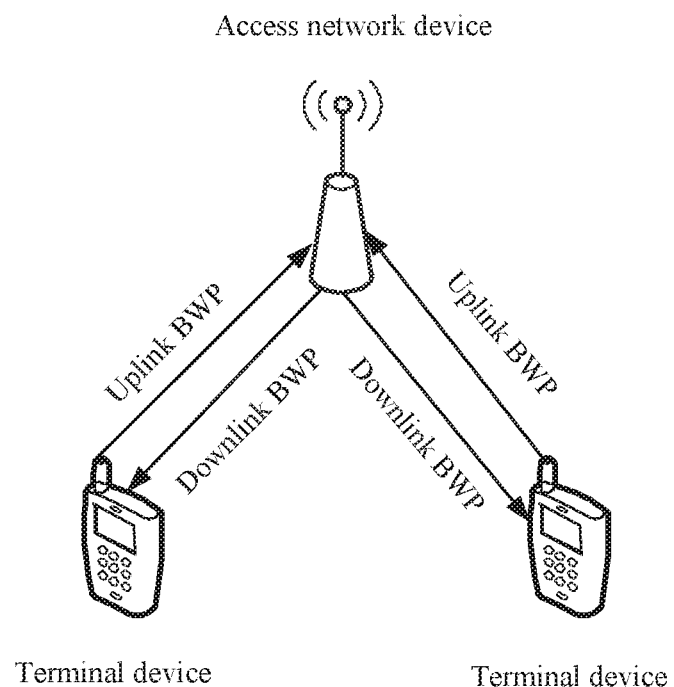
FIG. 1 is a simplified schematic diagram of a system architecture according to an embodiment of this application.

A BWP deactivation method provided in an embodiment of this application may be applied to a communications system shown in FIG. 1. The communications system may be a 5G mobile communications system, a long term evolution (Long Term Evolution, LTE) system, or another actual mobile communications system. This is not limited. As shown in FIG. 1, the communications system may include an access network device and a plurality of terminal devices. The terminal device can support a plurality of active BWPs, and communicate with the access network device by using the active BWP. For example, as shown in FIG. 1, the terminal device may receive, by using a downlink BWP, data sent by the access network, and the terminal device may further send data to the access network device by using an uplink BWP. In this embodiment of this application, an uplink BWP and a downlink BWP are determined based on a data transmission direction on a BWP and are a relative concept. Generally, if data is transmitted from the terminal device to the access network device on a BWP, the BWP is referred to as an uplink BWP; if data is transmitted from the terminal device to the access network device on a BWP, the BWP is referred to as a downlink BWP. In a time division duplex (Time Division Duplexing, TDD) mode, an uplink BWP and a downlink BWP are in pairs and are at a same location in frequency domain. In this case, an uplink BWP and a downlink BWP that are at a same location in the TDD mode are referred to as an uplink/downlink BWP pair, that is, may be understood as one BWP. It should be noted that FIG. 1 is merely a schematic frame diagram, a quantity of nodes included in FIG. 1 is not limited, and in addition to the functional nodes shown in FIG. 1, there may also be other nodes such as a core network device, a gateway device, and an application server. This is not limited.

The terminal device in FIG. 1 may be configured to connect, over a wireless air interface, to an access network device deployed by an operator, and then connect to a data network. The terminal device may be user equipment (User Equipment, UE) such as a mobile phone or a computer, or may be a cellular phone, a cordless telephone set, a session initiation protocol (Session Initiation Protocol, SIP) phone, a smartphone, a wireless local loop (Wireless Local Loop, WLL) station, a personal digital assistant (Personal Digital Assistant, PDA), a computer, a laptop computer, a handheld communications device, a handheld computing device, a satellite radio device, a modem card, a set top box (Set Top Box, STB), a customer premise equipment (Customer Premise Equipment, CPE), and/or another device used for communication in a wireless system. In this embodiment of this application, for ease of description, the terminal device in FIG. 1 is referred to as a first device for short.

The access network device in FIG. 1 is mainly configured to implement a wireless physical control function, resource scheduling, radio resource management, radio access control, mobility management, and other functions, and may be an access network (Access Network, AN)/radio access network (Radio Access Network, RAN) device, a network including a plurality of 5G-AN/5G-RAN nodes, a NodeB (NodeB, NB), or an evolved NodeB (Evolution NodeB, eNB). The G-AN/5G-RAN node may be an access node, a next generation NodeB (Generation NodeB, gNB), a transmission/reception point (Transmission Receive Point, TRP), a transmission point (Transmission Point, TP), or another access node. In this embodiment of this application, for ease of description, the access network device in FIG. 1 is referred to as a second device for short.

In a possible implementation, the access network device in FIG. 1 may send signaling to the terminal device, and the terminal device deactivates (deactivate) one or more BWPs in a plurality of active BWPs of the terminal device based on the signaling. It should be noted that in this embodiment of this application, deactivating a BWP (deactivate BWP) may mean switching a BWP from an active state to an inactive state, and the terminal device does not transmit data or control information on the BWP in an inactive state.

Figure 2:
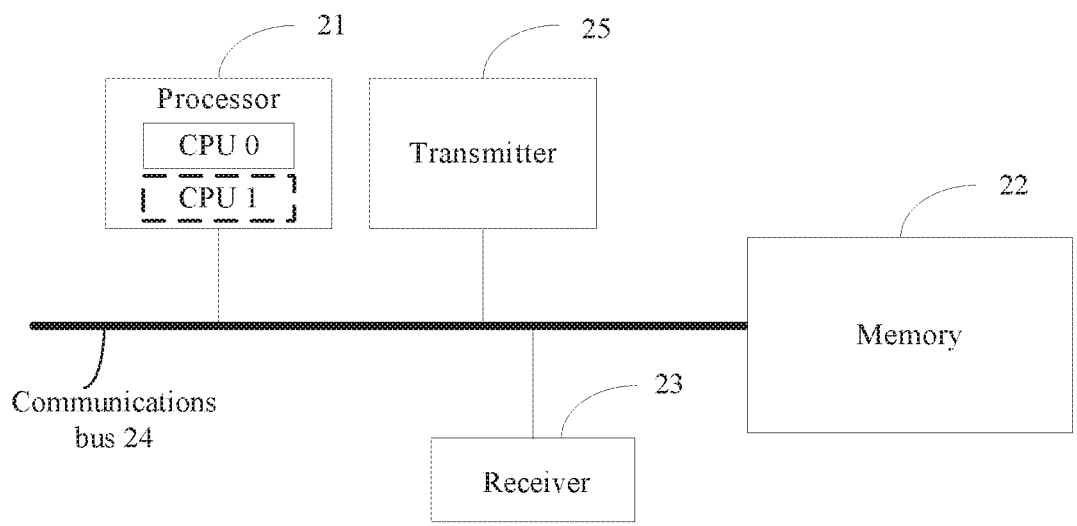
FIG. 2 is a schematic composition diagram of a communications device according to an embodiment of this application.

Specifically, to implement the BWP deactivation method provided in this embodiment of this application, the access network device and the terminal device in FIG. 1 may include components shown in FIG. 2. FIG. 2 is a schematic composition diagram of a communications device according to an embodiment of this application. As shown in FIG. 2, the communications device may include at least one processor 21, a memory 22, a receiver 23, a communications bus 24, and a transmitter 25. It should be noted that a device structure shown in FIG. 2 does not constitute any limitation on the communications device, and may include more or fewer components than those shown in the figure, a combination of some components, or components differently disposed. This is not limited in this embodiment of this application. The following specifically describes constituent parts of the communications device with reference to FIG. 2.

The processor 21 is a control center of the communications device, and may be a processor, or may be a general term of a plurality of processing elements. For example, the processor 21 may be a central processing unit (Central Processing Unit, CPU), may be an application-specific integrated circuit (Application Specific Integrated Circuit, ASIC), or may be configured as one or more integrated circuits implementing this embodiment of this application, for example, one or more microprocessors (Digital Signal Processor, DSP) or one or more field programmable gate arrays (Field Programmable Gate Array, FPGA). The processor 21 may perform various functions of the communications device by running or executing a software program stored in the memory 22 and by invoking data stored in the memory 22. In specific implementation, in an embodiment, the processor 21 may include one or more CPUs, for example, a CPU 0 and a CPU 1 shown in FIG. 2. Each of the processors may be a single-core processor (Single-CPU), or may be a multi-core processor (Multi-CPU). The processors herein may be one or more devices, circuits, and/or processing cores for processing data (for example, a computer program instruction).

The memory 22 may be a read-only memory (Read-Only Memory, ROM), another type of static storage device that can store static information and an instruction, a random access memory (Random Access Memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM), other optical disk storage, optical disc storage (including a compact disc, a laser disc, an optical disc, a digital versatile disc, a Blu-ray disc, and the like), a magnetic disk storage medium, another magnetic storage device, or any other medium that can be used to carry or store expected program code in a form of an instruction or a data structure and that can be accessed by a computer. However, no limitation is imposed thereto. The memory 22 may exist independently, and is connected to the processor 21 by using a communications bus 24. Alternatively, the memory 22 may be integrated with the processor 21. The memory 22 is configured to store a software program for performing the solution provided in this embodiment of this application, and the processor 21 controls execution of the software program.

The receiver 23 is configured to receive data or information sent by another device or a communications network during communication. The receiver 23 may include a receiving unit, to implement a receiving function. The transmitter 25 is configured to send data or information to another device or a communications network. The transmitter 25 may include a sending unit, to implement a sending function. Optionally, the receiver 23 and the transmitter 25 may be integrated into a transceiver module, where the transceiver module may be a radio frequency module including an antenna array.

The communications bus 24 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, the bus is represented by using only one thick line in FIG. 2. However, it does not mean that there is only one bus or only one type of bus.

That the communications device shown in FIG. 2 is the terminal device in FIG. 1 is used as an example. The receiver 23 may be configured to receive signaling sent by an access network device, and the processor 21 may be configured to deactivate at least one BWP of the terminal device based on the signaling.

That the communications device shown in FIG. 2 is the access network device in FIG. 1 is used as an example. The processor 21 may be configured to configure at least one BWP for a terminal device, and the transmitter 25 sends signaling to the terminal device, so that the terminal device deactivates a BWP of the terminal device based on the signaling.

With reference to the communications system shown in FIG. 1, the following describes the BWP deactivation method provided in this embodiment of this application.

Figure 3:
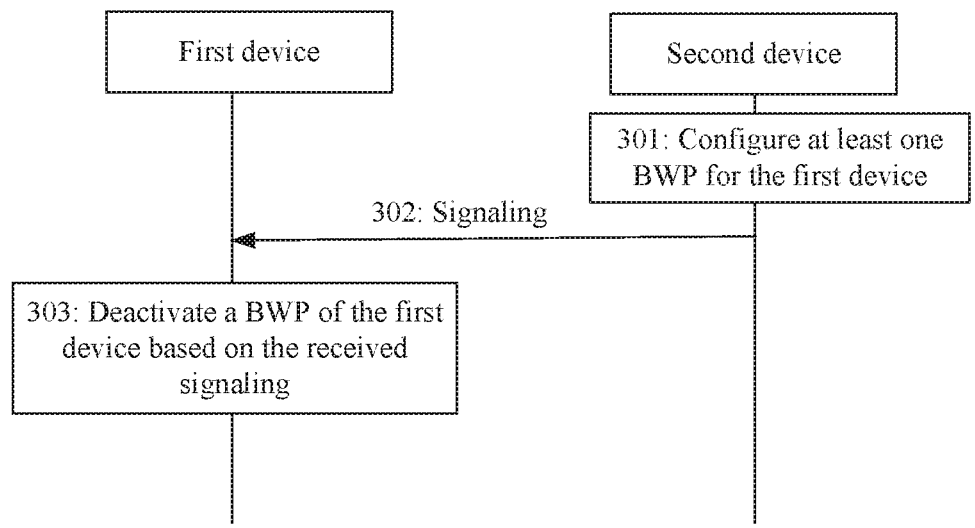
FIG. 3 is a flowchart of a BWP deactivation method according to an embodiment of this application.

FIG. 3 is a flowchart of a BWP deactivation method according to an embodiment of this application. The method is interactively performed by a first device and a second device, and the method may be used to deactivate one or more BWPs in a plurality of active BWPs of the first device. In an example, the first device may be any terminal device in FIG. 1, and the second device may be the access network device in FIG. 1. As shown in FIG. 3, the method may include steps 301 to step 303.

Step 301: The second device configures at least one BWP for the first device.

The at least one BWP may include at least one type of BWP: an uplink BWP, a downlink BWP, and an uplink/downlink BWP pair. The configuring, by the second device, at least one BWP for the first device may include: configuring the at least one BWP, or configuring the at least one BWP and related information of each BWP. The related information of the BWP may include one or more of the following information: a priority of the BWP, a bandwidth of the BWP, a frequency domain resource of the BWP, and an index number of the BWP. Priorities of different BWPs may be identical or different, bandwidths of different BWPs may be identical or different, frequency domain resources of different BWPs may be identical or different, an index number of a BWP may be used to identify the BWP configured for the first device, and index numbers of different BWPs may be identical or different. For example, index numbers of different uplink BWPs are different, index numbers of different downlink BWPs are different, and index numbers of an uplink BWP and a downlink BWP are identical. For example, an index number of an uplink BWP1 may be 1, and an index number of a downlink BWP1 may also be 1.

Optionally, the second device configures the at least one BWP for the first device by using higher layer signaling. The higher layer signaling may be radio resource control (Radio Resource Control, RRC) signaling or other signaling. This is not limited.

Step 302: The second device sends signaling to the first device, and the first device receives the signaling sent by the second device.

The signaling may be used to instruct the first device to deactivate a BWP of the first device based on the signaling. The signaling may be DCI, for example, may be data scheduling DCI, or may be DCI for the purpose other than data scheduling. This is not limited. Specifically, for a signaling format, refer to the following description. This is not elaborated herein.

Optionally, when the second device determines to deactivate a BWP that is in the BWP configured by the second device for the first device and that is in active BWPs, the second device sends the signaling to the first device at a resource location.

The resource location is used to indicate a time-frequency resource location occupied by the signaling, and the resource location may be a location of a control resource set (CORESET), a location of search space (Search Space, SS), or another resource location. This is not limited.

Step 303: The first device deactivates the BWP of the first device based on the received signaling.

Specifically, the first device may deactivate the BWP of the first device in any one of the following manner 1 to manner 4. The deactivated BWP in the following manners may be an uplink BWP or a downlink BWP. This is not limited.

Manner 1: The signaling received by the first device includes first indication information, and the first indication information is used to instruct whether to deactivate a BWP.

When the first indication information instructs to deactivate a BWP, the first device deactivates a BWP on which the signaling is located; otherwise, when the first indication information instructs to activate a BWP, the first device keeps a BWP, on which the signaling is located, still in an active state.

The signaling may be data scheduling DCI, and the first indication information may be 0 or 1. When the first indication information is 0, it indicates that a BWP is to be activated; or when the first indication information is 1, it indicates that a BWP is to be deactivated. The first indication information may alternatively be information in another form, for example, may be a letter A or B. When the first indication information is A, it indicates that a BWP is to be activated; or when the first indication information is a letter B, it indicates that a BWP is to be deactivated. The first indication information may alternatively be other information used to instruct whether to deactivate a BWP. This is not limited.

In the manner 1, in addition to the first indication information, the signaling may further include at least one type of information: signaling format indication information, second indication information, and other information. The signaling format indication information is used to indicate a type of the signaling. For example, when the signaling format indication information is 1, it may indicate that the signaling is data scheduling DCI. The second indication information may be used to indicate a first BWP for data transmission. The first BWP may be any BWP configured by the second device for the first device, and the first BWP may be the BWP on which the signaling is located, or may not be the BWP on which the signaling is located. This is not limited.

When the first BWP is the BWP on which the signaling is located and the first indication information instructs to deactivate a BWP, before the first device deactivates the BWP on which the signaling is located, to ensure data transmission continuity, the first device finishes transmitting data (that is, data currently being transmitted) on the first BWP, and then deactivates the BWP on which the signaling is located. When the first BWP is not the BWP on which the signaling is located and the first indication information instructs to deactivate a BWP, the first device deactivates the BWP on which the signaling is located, activates the first BWP, and transmits data on the first BWP. In this way, BWP skipping is completed. When the first BWP is the BWP on which the signaling is located and the first indication information instructs to activate a BWP, the first device keeps the first BWP still in an active state. When the first BWP is not the BWP on which the signaling is located and the first indication information instructs to activate a BWP, the first device activates the first BWP, and keeps the BWP, on which the signaling is located, still in an active state. In this embodiment of this application, data transmission may mean data receiving or data sending.

Figure 4A:
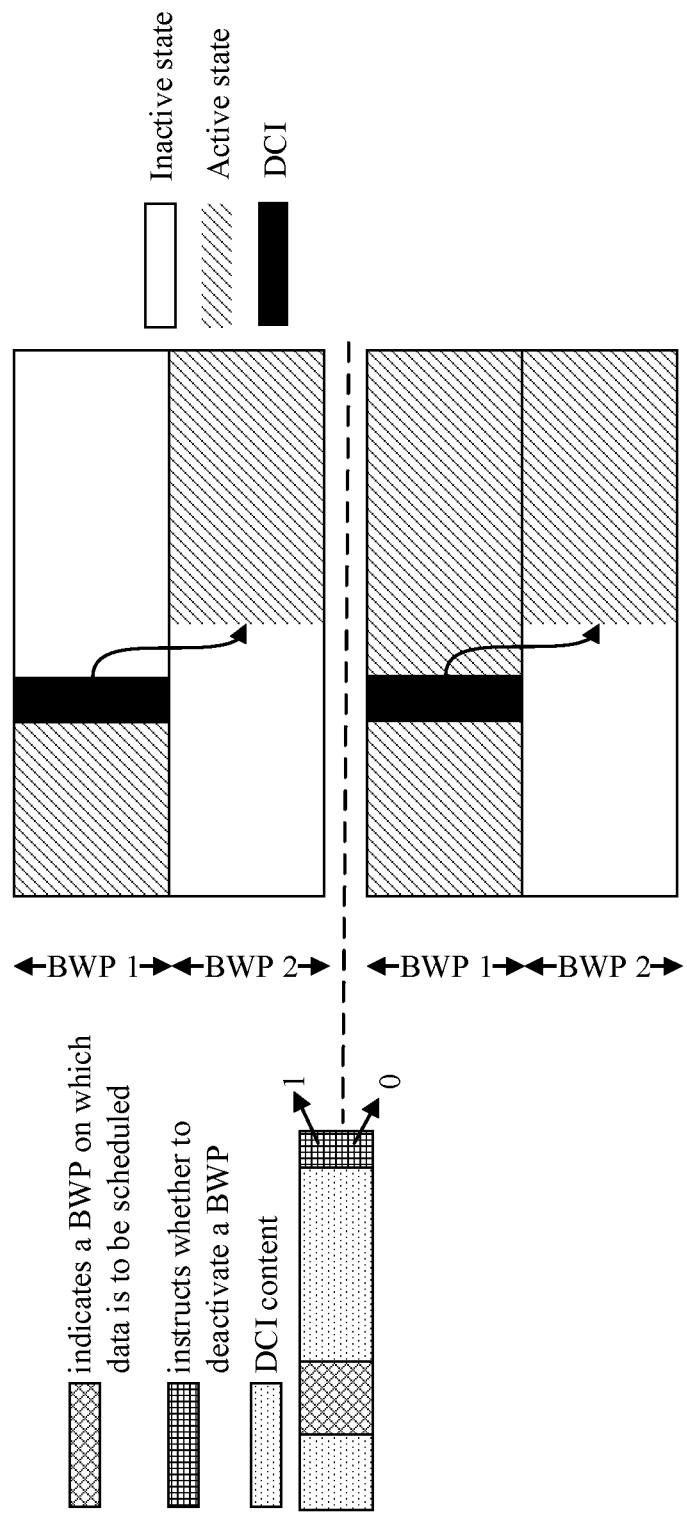
FIG. 4A is a schematic diagram for BWP deactivation according to an embodiment of this application.
Figure 4B:
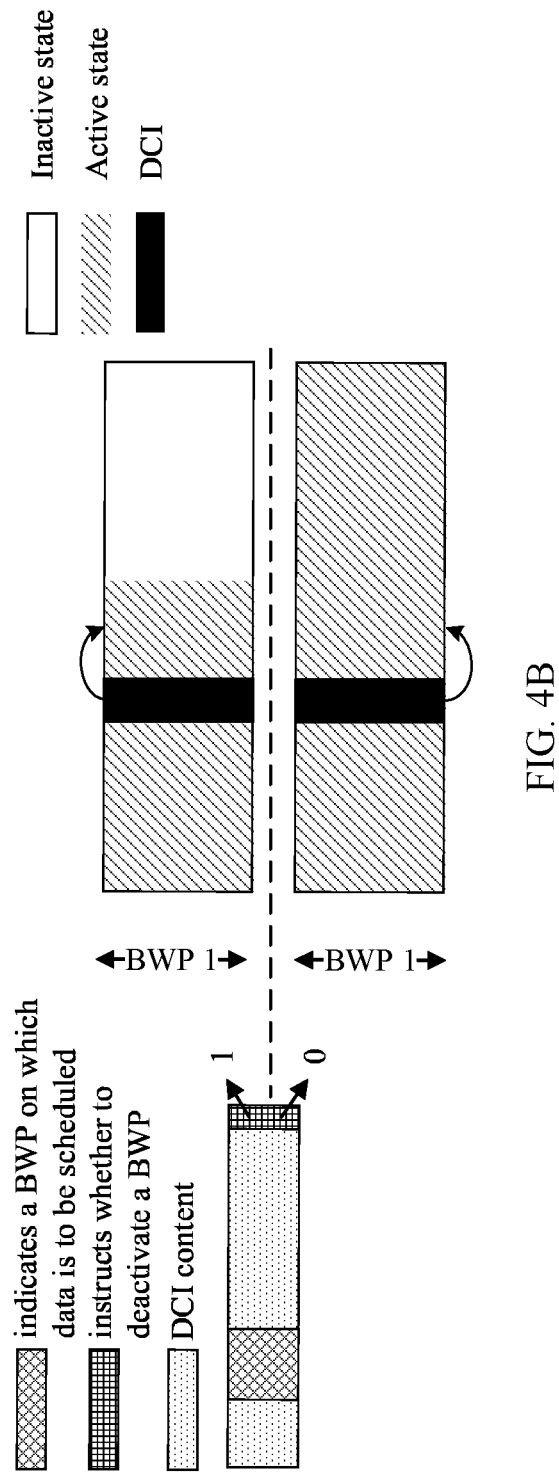
FIG. 4B is another schematic diagram for BWP deactivation according to an embodiment of this application.

That the first device is UE and the signaling is DCI is used as an example. As shown in FIG. 4A, the UE operates on a BWP1, the UE receives DCI on the BWP1, and the DCI is used to schedule data on a BWP2. In this case, if a deactivation indication in the DCI is 1, the UE skips from the BWP1 to the BWP2 to receive the data. In other words, the UE deactivates the BWP1 and activates the BWP2. If a deactivation indication in the DCI is 0, the UE activates only the BWP2, and keeps the BWP1 still in an active state. In this case, the UE operates on both the two active BWPs. As shown in FIG. 4B, the UE operates on a BWP1, the UE receives DCI on the BWP1, and the DCI is used to schedule data on the BWP1. In this case, if a deactivation indication in the DCI is 1, the UE receives the data on the BWP1, and deactivates the BWP1 after finishing data receiving. If a deactivation indication in the DCI is 0, the UE receives the data on the BWP1, and keeps the BWP1 still in an active state after finishing data receiving. It can be understood that in this embodiment of this application, if the UE operates on a BWP, it indicates that the BWP is in an active state. This is not elaborated subsequently.

It should be noted that the signaling may include 30 bits to 40 bits that may be numbered from 0 to n. A bit field occupied by each piece of information included in the signaling may be set depending on a requirement, and each bit field may include at least one bit. For example, when the signaling includes the signaling format indication information, the first indication information, and the second indication information, the signaling format indication information, the first indication information, and the second indication information may be sequentially added to the signaling in ascending order of numbers of the bits; or the signaling format indication information, the second indication information, and the first indication information may be sequentially added to the signaling in ascending order of numbers of the bits. This is not limited. For example, the signaling may include the first bit to the $30^{th}$ bit, where the first bit to the third bit are a bit field of an indication signaling format, the fifth bit to the eighth bit may be a bit field occupied by the second indication information, and the $15^{th}$ bit to the $18^{th}$ bit may be a bit field occupied by the first indication information.

In addition, the signaling may further include resource allocation indication information. The resource allocation indication information may be used to indicate a time-frequency resource location occupied by data transmitted on the first BWP. When the signaling includes the signaling format indication information, the first indication information, the second indication information, and the resource allocation indication information, the signaling format indication information, the second indication information, the first indication information, and the resource allocation indication information may be sequentially added to the signaling in ascending order of numbers of the bits; or the signaling format indication information, the second indication information, the resource allocation indication information, and the first indication information may be sequentially added to the signaling in ascending order of numbers of the bits. This is not limited.

Manner 2: The signaling received by the first device includes third indication information and fourth indication information, the third indication information is used to indicate that the signaling is signaling instructing to deactivate a BWP, and the fourth indication information indicates at least one BWP.

The first device deactivates, based on the fourth indication information, the at least one BWP indicated by the fourth indication information.

The signaling in the manner 2 may be DCI for the purpose other than data scheduling, and is different from data scheduling DCI in another manner. The third indication information is information indicating a signaling format (format), and based on the third indication information, the first device may determine to deactivate a BWP. The fourth indication information may be identification information of the at least one BWP and is used to identify the BWP, and the identification information may be an index number or number of the BWP.

Figure 5:
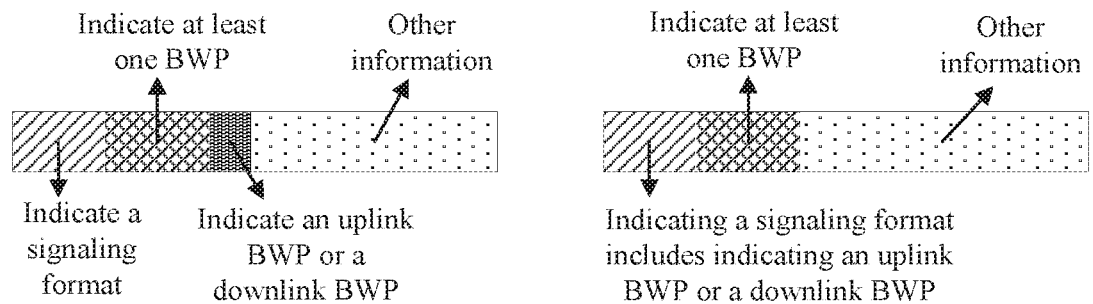
FIG. 5 is a schematic diagram for BWP deactivation according to an embodiment of this application.

It should be noted that in this embodiment of this application, identification information corresponding to an uplink BWP and a downlink BWP may be identical or different. When the identification information corresponding to the uplink BWP and the downlink BWP is the same, the signaling in the manner 2 may further include uplink/downlink information, and the uplink/downlink information is used to indicate whether a to-be-deactivated BWP is an uplink BWP or a downlink BWP. The uplink/downlink information may separately occupy a bit field of the signaling (as shown in the left figure in FIG. 5); or may be included in the third indication information (as shown in the right figure in FIG. 5), that is, the third indication information indicates that the signaling is signaling instructing to deactivate an uplink BWP or a downlink BWP. For example, when the third indication information is 2a, it indicates that an uplink BWP is to be deactivated; or when the third indication information is 2b, it indicates that a downlink BWP is to be deactivated. In this case, it is assumed that both identification information of an uplink BWP1 and the identification information of the downlink BWP are 1, when the third indication information is 2a and the fourth indication information is 1, it indicates that the uplink BWP1 is to be deactivated; or when the third indication information is 2b and the fourth indication information is 1, it indicates that a downlink BWP1 is to be deactivated.

Moreover, in addition to the foregoing information, the signaling in the manner 2 may further include other information, such as a carrier indicator (carrier indicator), a transmit power control command (TPC command), a channel state information request (CSI request), an SRS resource indicator (SRS resource indicator), and other information. This is not limited. The channel state information request is included only in signaling used to instruct to deactivate a downlink BWP, and the SRS resource indicator is included only in signaling used to instruct to deactivate an uplink BWP.

Manner 3: The first device deactivates the BWP of the first device based on the resource location occupied by the signaling.

In the manner 3, the signaling may be data scheduling DCI. Different from the DCI in the manner 1, the DCI in the manner 3 does not include the first indication information. Except for the first indication information, information included in the DCI in the manner 3 is the same as that included in the DCI in the manner 1. This is not elaborated herein again.

The resource location occupied by the signaling is a location of a control resource set in which the signaling is located, a location of search space in which the signaling is located, or another resource location, and the resource location occupied by the signaling has a correspondence with whether to deactivate a BWP. The correspondence may be configured by the second device for the first device by using higher layer signaling, or may be specified by a protocol. One or more resource locations may be corresponding to BWP deactivation. For example, a resource location 0, a resource location 2, and a resource location 3 are all corresponding to BWP deactivation. When receiving the signaling at any one of the resource location 0, the resource location 2, and the resource location 3, the first device performs an action of BWP deactivation.

Optionally, when the first device receives the signaling sent by the second device at a first resource location, and the first resource location is corresponding to BWP deactivation, the first device deactivates the BWP on which the signaling is located. When the first resource location is corresponding to BWP activation, the first device keeps the BWP, on which the signaling is located, still in an active state. The first device may perform, one by one, blind detection on resource locations that may be occupied by the signaling. If the blind detection performed at the first resource location succeeds, it is determined that the signaling sent by the second device is received at the first resource location. For a process of performing the blind detection by the first device, refer to the prior art. This is not elaborated herein.

That the resource location occupied by the signaling is CORESET is used as an example. Table 1 lists a correspondence between a resource location and whether to deactivate a BWP. As listed in Table 1, CORESET0 is corresponding to BWP deactivation, and CORESET1 is corresponding to BWP activation.

TABLE 1

| Resource location occupied by signaling | Whether to deactivate a BWP |
|---|---|
| CORESET0 | BWP deactivation |
| CORESET1 | BWP activation |

With reference to Table 1, the following describes the manner 3 by using an example in which the first device is UE and the signaling is data scheduling DCI.

Figure 6:
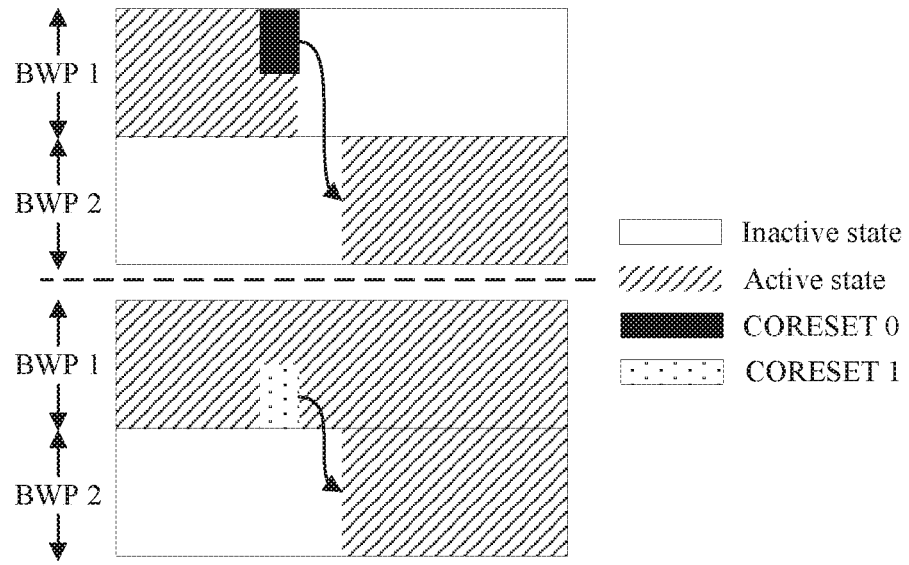
FIG. 6 is another schematic diagram for BWP deactivation according to an embodiment of this application.

As shown in FIG. 6, the UE initially operates on a BWP1, the UE receives DCI on the BWP1, and the DCI is used to schedule data on a BWP2. In this case, if the DCI is located in CORESET0, the UE skips from the BWP1 to the BWP2 to receive the data. In other words, the UE deactivates the BWP1 and activates the BWP2. If the DCI is located in CORESET1, the UE activates only the BWP2 and does not deactivate the BWP1. In this case, the UE operates on both the two active BWPs.

It should be noted that CORESET0 and CORESET1 may be correspondingly replaced with SS0 and SS1. A manner of deactivating a BWP by the first device based on SS0 and SS1 is the same as a manner of deactivating a BWP by the first device based on CORESET0 and CORESET1. This is not elaborated herein again.

Manner 4: The first device deactivates the BWP of the first device based on the signaling and a capability of the first device.

The signaling in the manner 4 may include fifth indication information, and the fifth indication information is used to instruct to activate a second BWP of the first device. The second BWP may be any BWP in an inactive BWP configured by the second device for the first device. The capability of the first device includes a maximum quantity of BWPs supported by the first device or a maximum bandwidth supported by the first device. The capability of the first device may be configured by the second device for the first device; or may be determined by the first device and then reported to the second device, so that the second device determines, based on the capability of the first device reported by the first device, whether to deactivate the BWP of the first device.

In a possible implementation, the deactivating, by the first device, the BWP of the first device based on the signaling and a capability of the first device includes: activating, by the first device, the second BWP based on the fifth indication information; and after the first device activates the second BWP, if a capability of all active BWPs of the first device is beyond the capability supported by the first device, deactivating, by the first device, at least one BWP in the active BWPs of the first device other than the second BWP, until the capability of all the active BWPs of the first device is within the capability supported by the first device.

The capability of all the active BWPs of the first device may include a total quantity of all the active BWPs or a sum of bandwidths of all the active BWPs. That the capability of all the active BWPs of the first device is beyond the capability supported by the first device means that the total quantity of all the active BWPs of the first device is greater than the maximum quantity of BWPs supported by the first device, or that the total bandwidth of the active BWPs of the first device is greater than maximum bandwidth supported by the first device.

Specifically, the first device may deactivate one BWP in the active BWPs of the first device other than the second BWP based on at least one of the following five types of information, so that the quantity of active BWPs of the first device is not beyond the maximum quantity of BWPs supported by the first device: activation time of the active BWPs of the first device, priorities of the active BWPs of the first device, bandwidth values of the active BWPs of the first device, index numbers of the active BWPs of the first device, and frequency spacings between the active BWPs of the first device and the second BWP. For example, the first device may deactivate, based on a chronological order of the activation time of the active BWPs, a BWP corresponding to earlier (later) time before deactivating a BWP corresponding to later (earlier) time, until the capability of all the current active BWPs of the first device is within the capability of the first device. Alternatively, the first device deactivates, based on an ascending/descending order of the priorities of the active BWPs, a BWP corresponding to a highest (lowest)

priority before deactivating a BWP corresponding to a second highest (second lowest) priority, until the capability of all the current active BWPs of the first device is within the capability of the first device. Alternatively, the first device deactivates, based on the bandwidth values of the active BWPs, a BWP corresponding to a highest (lowest) bandwidth before deactivating a BWP corresponding to a second highest (second lowest) bandwidth, until the capability of all the current active BWPs of the first device is within the capability of the first device. Alternatively, the first device deactivates, based on values of the index numbers of the active BWPs, a BWP corresponding to a largest (smallest) index number before deactivating a BWP corresponding to a second largest (second smallest) index number, until the capability of all the current active BWPs of the first device is within the capability of the first device. Alternatively, the first device deactivates, based on values of the frequency spacings between the active BWPs and the second BWP, a BWP corresponding to a largest frequency spacing before deactivating a BWP corresponding to a second largest frequency spacing, until the capability of all the current active BWPs of the first device is within the capability of the first device. In this way, continuity of frequencies between the active BWPs of the first device is ensured, thereby facilitating hardware implementation of a radio frequency link. Alternatively, when the activation time of the active BWPs of the first device is the same, the first device may deactivate one BWP in the active BWPs of the first device other than the second BWP based on one or more types of information: the priorities of the active BWPs, the bandwidth values of the active BWPs of the first device, the index numbers of the active BWPs of the first device, and the frequency spacings between the active BWPs of the first device and the second BWP. Similarly, when the priorities of the active BWPs of the first device are the same, the first device may deactivate a BWP based on other one or more of the foregoing five types of information. The rest can be deduced by analogy. In other words, when characteristics of the active BWPs of the first device (one or more of the activation time, the priorities, the bandwidth values, and the index numbers that are of the BWP, and the frequency spacings between the BWP and the second BWP) are the same, the first device may deactivate the at least one BWP in the active BWPs other than the second BWP based on other characteristics of the active BWPs, until the capability of all the current active BWPs of the first device is within the capability of the first device.

The activation time of the active BWPs of the first device is recorded in the first device when the first device activates the BWPs. For example, when the first device performs the foregoing BWP deactivation process based on the activation time of the active BWPs, the first device may directly record the active BWPs and the activation time of the active BWPs correspondingly in a record area; or may only correspondingly record, in the record area in a chronological order (reverse order) of the activation time, identification information (such as index numbers) used to indicate the BWPs, to reduce record overheads. For example, if an index number of a BWP1 is 1, an index number of a BWP2 is 2, and activation time of the BWP1 is prior to that of the BWP2, 1 and 2 may be sequentially recorded in the record area, or 2 and 1 may be sequentially recorded in the record area. It should be noted that in this implementation, when index numbers of an uplink BWP and a downlink BWP are the same, an uplink/downlink identifier plus identification information of a BWP may alternatively be recorded.

The priorities of the active BWPs of the first device, the bandwidth values of the active BWPs of the first device, the index numbers of the active BWPs of the first device, and frequency resources of the active BWPs of the first device may be configured by the second device for the first device in step 301. The frequency spacings between the active BWPs of the first device and the second BWP may be calculated by the first device based on a difference between the frequency resources of the active BWPs and a frequency resource of the second BWP.

Specifically, that the first device deactivates a BWP based on some information in the foregoing five types of information may be specified by a protocol, or may be configured by the second device for the first device. For example, the second device sends configuration information to the first device; and the first device receives the configuration information sent by the second device, and deactivates one BWP in the active BWPs of the first device other than the second BWP according to an indication of the configuration information and based on the at least one of the foregoing five types of information. The configuration information is used to instruct the first device to deactivate one BWP in the active BWPs of the first device other than the second BWP based on the at least one of the foregoing five types of information. In this way, the second device may specify specific types of information to be used to deactivate a BWP.

In another possible implementation, the deactivating, by the first device, the BWP of the first device based on the signaling and a capability of the first device includes: before the first device activates the second BWP based on the fifth indication information, when the first device determines that the capability of the current active BWPs of the first device exactly reaches the capability of the first device, the capability of the active BWPs of the first device is beyond the capability of the first device if the second BWP is activated; and the first device does not activate the second BWP based on the fifth indication information. In this case, the method further includes: sending, by the first device, an activation failure message to the second device; and receiving, by the second device, the activation failure message sent by the second device, where the activation failure message is used to notify the second device that the second BWP is not activated.

For example, the first device supports a maximum of two BWPs. The UE initially operates on two BWPs: a BWP1 and a BWP2. When the signaling received by the first device is used to instruct to activate a BWP3, and the first device finds that if the first device activates the BWP3, a quantity of active BWPs exceeds a maximum quantity of BWPs that can be supported by the first device. Therefore, the first device does not activate the BWP3, and sends an activation failure message to the second device, to notify the second device that the BWP3 is not activated.

With reference to FIG. 7A to FIG. 7D, the following uses an example in which the first device is UE and the UE receives information that is used to instruct to activate a BWP3 and that is included in signaling, to describe a solution that when a total quantity of all active BWPs of the first device is greater than a maximum quantity of BWPs supported by the first device, the first device deactivates at least one BWP in the active BWPs of the first device other than a second BWP.

Figure 7A:
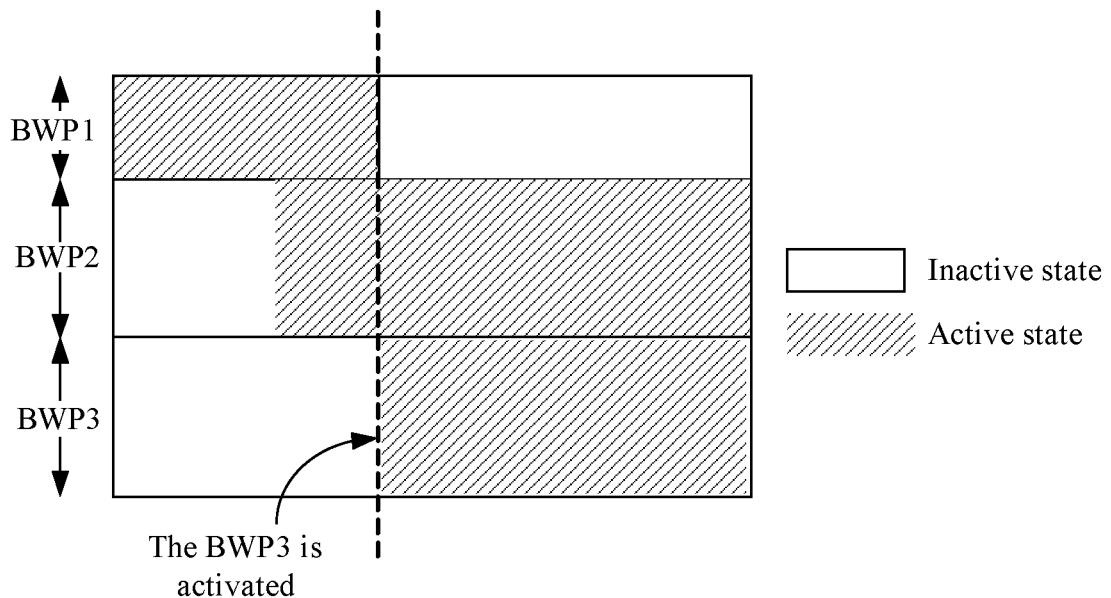
FIG. 7A is still another schematic diagram for BWP deactivation according to an embodiment of this application.

As shown in FIG. 7A, the UE supports a maximum of two BWPs. The UE initially operates on two BWPs: a BWP1 and a BWP2, and the BWP1 is activated before the BWP2. When the UE activates the BWP3 based on the received signaling, the UE finds that the quantity of active BWPs exceeds the maximum quantity of BWPs that can be supported by the UE. Therefore, the UE deactivates a BWP activated earlier in the BWP1 and the BWP2, that is, the BWP1.

Figure 7B:
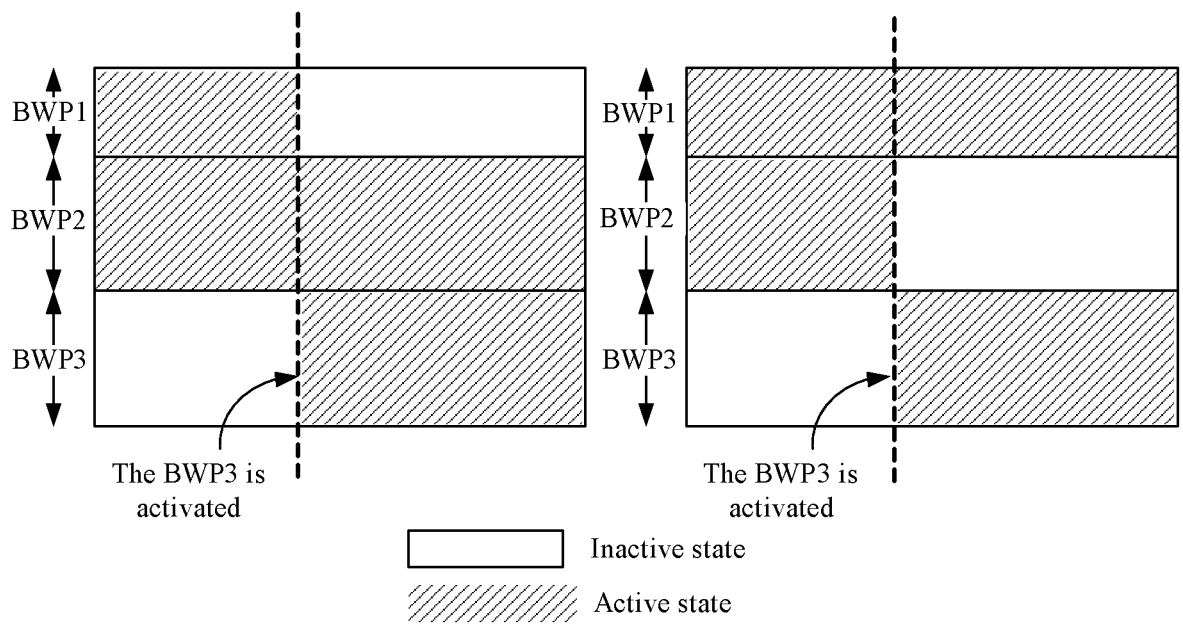
FIG. 7B is still another schematic diagram for BWP deactivation according to an embodiment of this application.

Alternatively, as shown in FIG. 7B, the UE supports a maximum of two BWPs. The UE initially operates on two BWPs: a BWP1 and a BWP2. When the UE activates the BWP3 based on the received signaling, the UE finds that the quantity of active BWPs exceeds the maximum quantity of BWPs that can be supported by the UE. Therefore, the UE deactivates a BWP corresponding to a lower bandwidth in the BWP1 and the BWP2, that is, the BWP1, as shown in the left figure in FIG. 7B; or the UE deactivates a BWP corresponding to a higher bandwidth in the BWP1 and the BWP2, that is, the BWP2, as shown in the right figure in FIG. 7B.

Alternatively, the UE supports a maximum of two BWPs. The UE initially operates on two BWPs: a BWP1 and a BWP2. When the UE activates the BWP3 based on the received signaling, the UE finds that the quantity of active BWPs exceeds the maximum quantity of BWPs that can be supported by the UE. Therefore, the UE deactivates a BWP corresponding to a smaller index number (index) in the BWP1 and the BWP2, that is, the BWP1; or the UE deactivates a BWP corresponding to a larger index in the BWP1 and the BWP2, that is, the BWP2.

Alternatively, the UE supports a maximum of two BWPs. The UE initially operates on two BWPs: a BWP1 and a BWP2. When the UE activates the BWP3 based on the received signaling, the UE finds that the quantity of active BWPs exceeds the maximum quantity of BWPs that can be supported by the UE. Therefore, the UE deactivates a BWP corresponding to a lower priority in the BWP1 and the BWP2. For example, if a priority sequence of the BWPs configured by an access network device (such as a base station) for the UE is that a priority of the BWP1 is lower than that of the BWP2, the UE deactivates the BWP1.

Figure 7C:
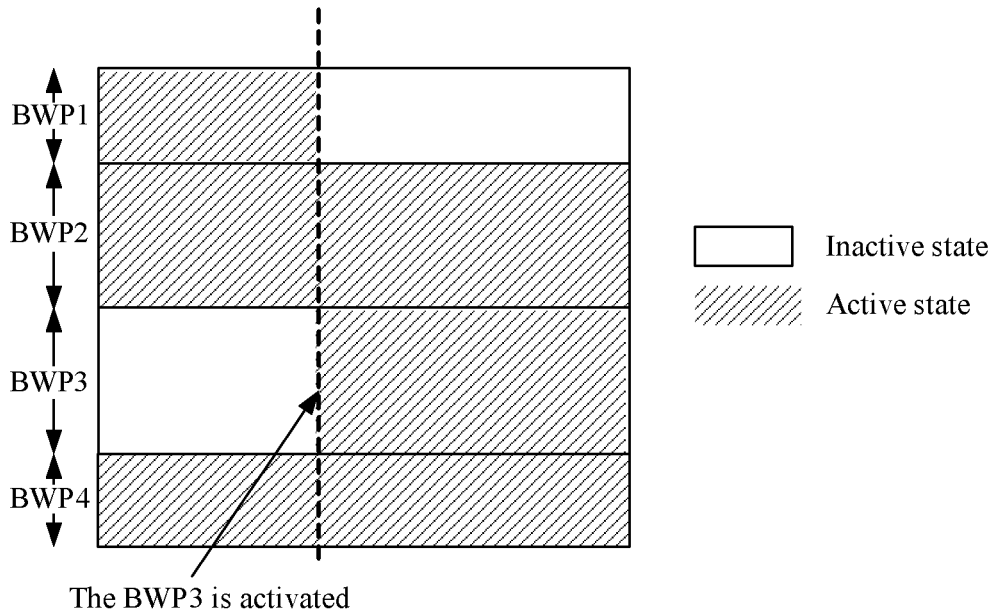
FIG. 7C is still another schematic diagram for BWP deactivation according to an embodiment of this application.

Alternatively, as shown in FIG. 7C, the UE supports a maximum of three BWPs. The UE initially operates on three BWPs: a BWP1, a BWP2, and a BWP4. When the UE activates the BWP3 based on the received signaling, the UE finds that the quantity of active BWPs exceeds the maximum quantity of BWPs that can be supported by the UE. Therefore, the UE deactivates a BWP that is farther away from the BWP3 among the BWP1, the BWP2, and the BWP4, that is, deactivates the BWP1.

Figure 7D:
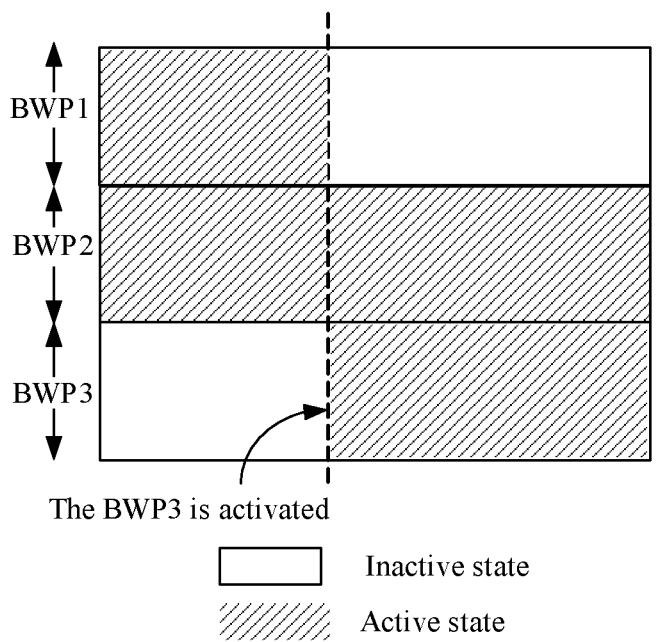
FIG. 7D is still another schematic diagram for BWP deactivation according to an embodiment of this application.

Alternatively, as shown in FIG. 7D, the UE supports a maximum of two BWPs. The UE initially operates on two BWPs: a BWP1 and a BWP2. When the UE activates the BWP3 based on the received signaling, the UE finds that the quantity of active BWPs exceeds the maximum quantity of BWPs that can be supported by the UE. In this case, the UE deactivates a BWP based on activation time of the BWPs, where the activation time of the BWP1 and the BWP2 is the same; and deactivates a BWP based on bandwidth values of the BWPs. If the bandwidths of the two BWPs are also the same, the UE then deactivates a BWP based on index numbers of the BWPs. The UE deactivates a BWP corresponding to a smaller index number (index) in the BWP1 and the BWP2, that is, the BWP1.

With reference to FIG. 8A to FIG. 8E, the following uses an example in which the first device is UE, to describe a solution that when a total bandwidth of all active BWPs of the first device is greater than a maximum bandwidth supported by the first device, the first device deactivates at least one BWP in the active BWPs of the first device other than a second BWP.

Figure 8A:
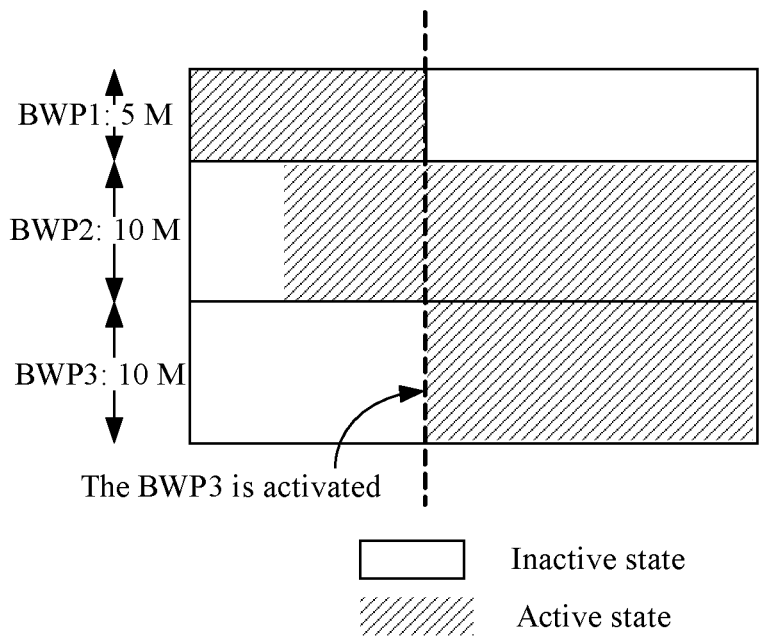
FIG. 8A is yet another schematic diagram for BWP deactivation according to an embodiment of this application.

As shown in FIG. 8A, a maximum bandwidth supported by the UE is 20 M, a bandwidth of a BWP1 is 5 M, a bandwidth of a BWP2 is 10 M, and a bandwidth of a BWP3 is 10 M. The UE initially operates on two BWPs, and the BWP1 is activated before the BWP2. When the UE activates the BWP3 based on the received signaling, a total bandwidth of the three BWPs is 25 M and is greater than the maximum bandwidth supported by the UE. Therefore, the UE deactivates a BWP activated earlier in the BWP1 and the BWP2, that is, the BWP1; and finds that a bandwidth of the BWP2 and the BWP3 that are activated in this case is 20 M, and is within the maximum bandwidth 20 M supported by the UE. Then, the deactivation process ends.

Figure 8B:
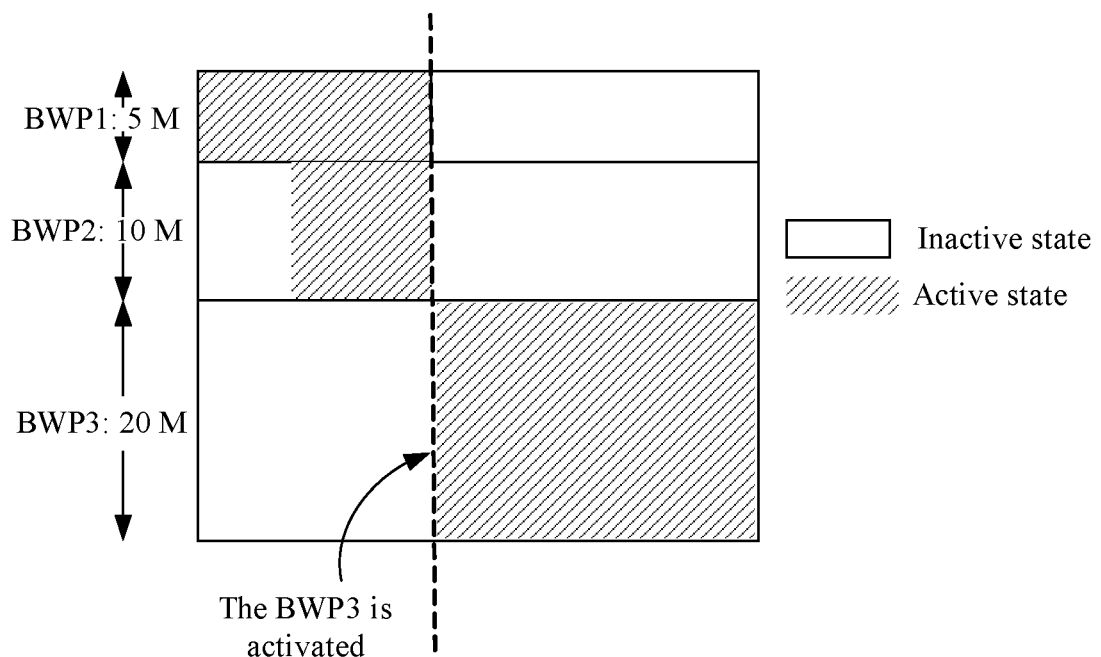
FIG. 8B is yet another schematic diagram for BWP deactivation according to an embodiment of this application.

Alternatively, as shown in FIG. 8B, a maximum bandwidth supported by the UE is 20 M, a bandwidth of a BWP1 is 5 M, a bandwidth of a BWP2 is 10 M, and a bandwidth of a BWP3 is 20 M. The UE initially operates on two BWPs, and the BWP1 is activated before the BWP2. When the UE activates the BWP3 based on the received signaling, a total bandwidth of the three BWPs is 35 M and is greater than the maximum bandwidth supported by the UE. Therefore, the UE deactivates a BWP activated earlier in the BWP1 and the BWP2, that is, the BWP1. However, after only the BWP1 is deactivated, a total bandwidth of the BWP2 and the BWP3 is 30 M and is still beyond the maximum bandwidth supported by the UE. In this case, the UE also deactivates the BWP2.

Figure 8C:
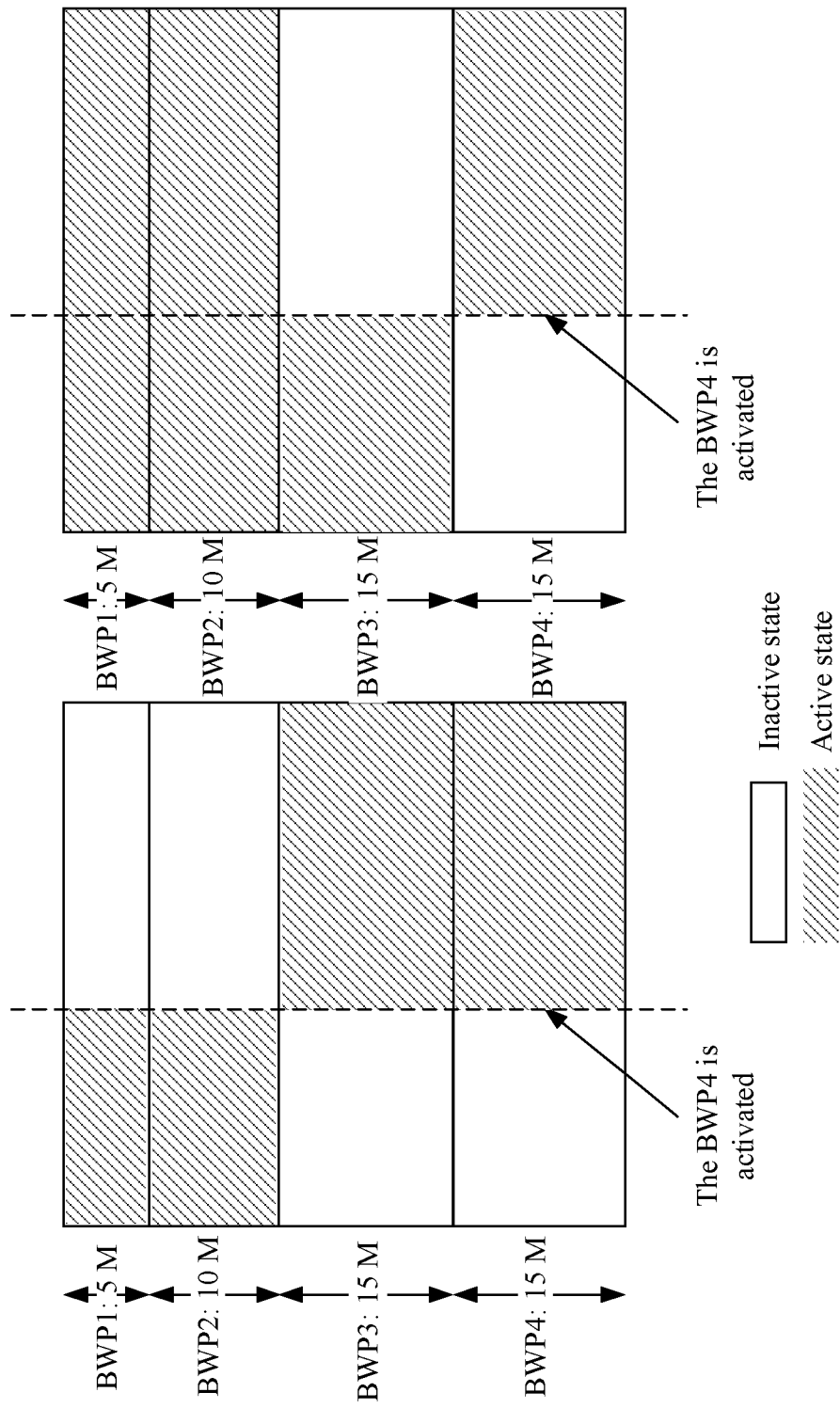
FIG. 8C is yet another schematic diagram for BWP deactivation according to an embodiment of this application.

Alternatively, as shown in FIG. 8C, a maximum bandwidth supported by the UE is 30 M, a bandwidth of a BWP1 is 5 M, a bandwidth of a BWP2 is 10 M, and bandwidths of a BWP3 and a BWP4 are 15 M. When the BWP4 is activated, a total bandwidth of the four BWPs is 45 M and is greater than the maximum bandwidth supported by the UE. The UE deactivates BWPs in a specific order until a total bandwidth of a remaining BWP is less than or equal to 30 M. In the left figure in FIG. 8C, a BWP is deactivated in ascending order of BWP bandwidths, that is, a BWP is deactivated in a sequence of the BWP1, the BWP2, and the BWP3, and finally the BWP1 and the BWP2 are deactivated. In the right figure in FIG. 8C, a BWP is deactivated in descending order of BWP bandwidths, that is, a BWP is deactivated in a sequence of the BWP3, the BWP2, and the BWP1, and finally the BWP3 is deactivated.

Figure 8D:
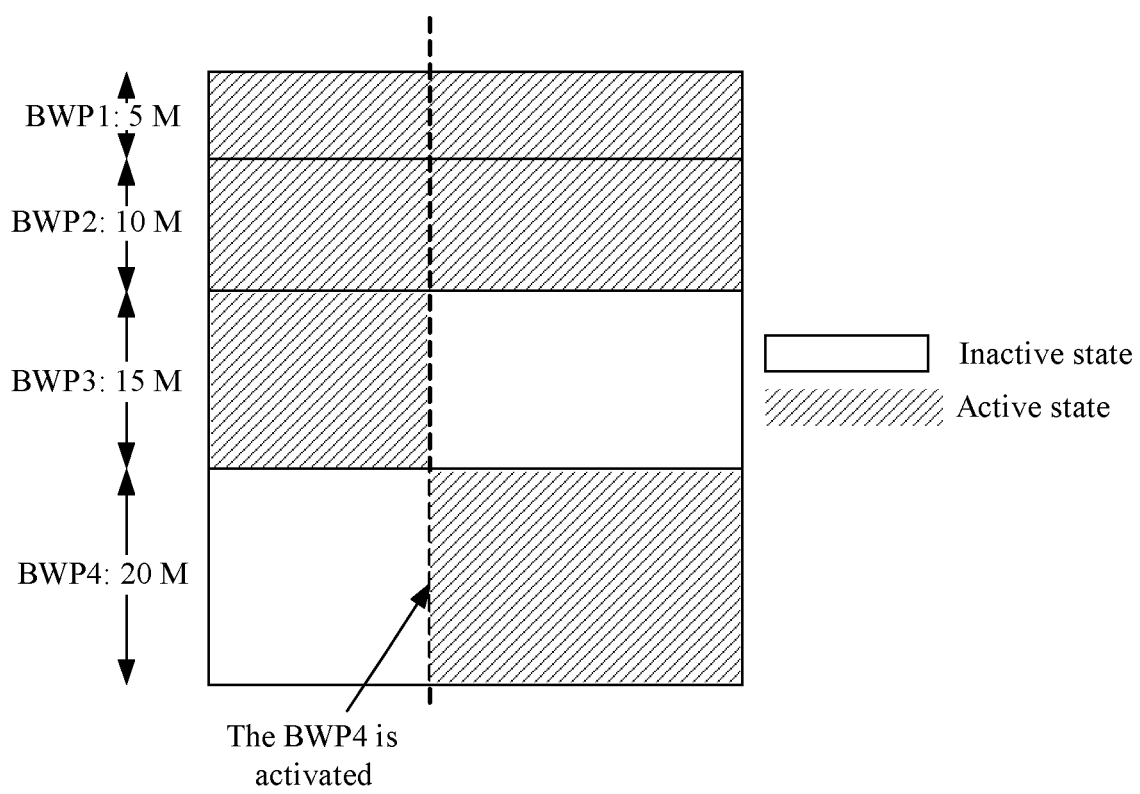
FIG. 8D is yet another schematic diagram for BWP deactivation according to an embodiment of this application.

Alternatively, as shown in FIG. 8D, a maximum bandwidth supported by the UE is 35 M, a bandwidth of a BWP1 is 5 M, a bandwidth of a BWP2 is 10 M, a bandwidth of a BWP3 is 15 M, and a bandwidth of a BWP4 is 20 M. When the BWP4 is activated, a total bandwidth of the four BWPs is 50 M and is greater than the maximum bandwidth supported by the UE. Therefore, the UE considers deactivating the BWP1, the BWP2, or the BWP3. After the BWP3 is deactivated, a bandwidth requirement of the UE can be satisfied. In this case, the BWP3 is deactivated.

Alternatively, as shown in FIG. 8D, a maximum bandwidth supported by the UE is 30 M, a bandwidth of a BWP1 is 5 M, a bandwidth of a BWP2 is 10 M, a bandwidth of a BWP3 is 15 M, and a bandwidth of a BWP4 is 20 M. When the BWP4 is activated, a total bandwidth of the four BWPs is 50 M and is greater than the maximum bandwidth supported by the UE. Therefore, the UE considers deactivating the BWP1, the BWP2, or the BWP3. However, regardless of deactivating any one of the three BWPs, a bandwidth requirement cannot be satisfied. Therefore, the UE first deactivates the BWP3, and then attempts to deactivate another BWP. After the BWP3 and the BWP1 are deactivated, the bandwidth requirement can be satisfied. In this case, the BWP3 and the BWP1 are deactivated.

Alternatively, for example, a maximum bandwidth supported by the UE is 20 M, a bandwidth of a BWP1 is 5 M, a bandwidth of a BWP2 is 10 M, and a bandwidth of a BWP3 is 10 M. The UE initially operates on two BWPs: the BWP1 and the BWP2. When the BWP3 is activated, the UE deactivates a BWP based on index numbers of the BWPs, that is, deactivates the BWP; and finds that a bandwidth requirement has been satisfied. In this case, only the BWP1 is deactivated. If the maximum bandwidth supported by the UE is 15 M, the UE deactivates a BWP based on the index numbers of the BWPs, that is, deactivates the BWP1. In this case, the UE finds that the bandwidth requirement still cannot be satisfied, and the UE further deactivates the BWP2. Finally, both the BWP1 and the BWP2 are deactivated.

Alternatively, for example, a maximum bandwidth supported by the UE is 20 M, a bandwidth of a BWP1 is 5 M, a bandwidth of a BWP2 is 10 M, and a bandwidth of a BWP3 is 10 M. The UE initially operates on two BWPs: the BWP1 and the BWP2. A priority of the BWP1 originally configured by a base station for the UE is lower than that of the BWP2. When the BWP3 is activated, the UE deactivates the BWP1 based on an ascending order of priorities of the BWPs; and finds that a bandwidth requirement has been satisfied. In this case, only the BWP1 is deactivated. If the maximum bandwidth supported by the UE is 15 M, after the UE deactivates the BWP1 based on the ascending order of priorities of the BWPs, the UE finds that the bandwidth requirement still cannot be satisfied, and the UE further deactivates the BWP2. Finally, both the BWP1 and the BWP2 are deactivated.

Figure 8E:
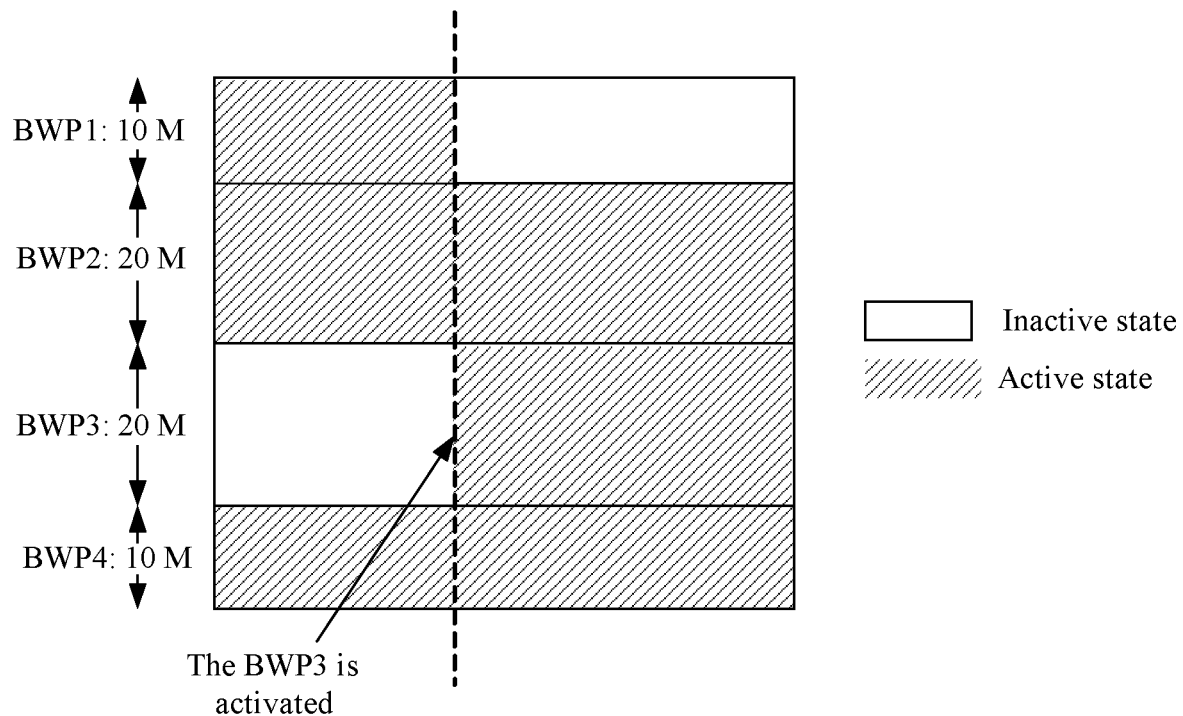
FIG. 8E is yet another schematic diagram for BWP deactivation according to an embodiment of this application.

Alternatively, as shown in FIG. 8E, a maximum bandwidth supported by the UE is 50 M, a bandwidth of a BWP1 is 10 M, a bandwidth of a BWP2 is 20 M, a bandwidth of a BWP3 is 20 M, and a bandwidth of a BWP4 is 10 M. The UE initially operates on three BWPs: the BWP1, the BWP2, and the BWP4. When the BWP3 is activated, the UE finds that the quantity of active BWPs exceeds the maximum bandwidth that can be supported by the UE. Therefore, the UE deactivates a BWP that is farther away from the BWP3 among the BWP1, the BWP2, and the BWP4, that is, deactivates the BWP1. In this case, the UE finds that a total bandwidth of the BWP2, the BWP3, and the BWP4 satisfies a bandwidth requirement. Then, only the BWP1 is deactivated.

In this way, in the solutions shown in FIG. 3, the second device sends the signaling to the first device; and after receiving the signaling, the first device deactivates the BWP based on the signaling, to deactivate one or more BWPs in a plurality of active BWPs of the first device, thereby improving an energy saving effect of the first device.

The foregoing mainly describes the solutions provided in this embodiment of this application from a perspective of interaction between nodes. It can be understood that, to implement the foregoing functions, the nodes, such as the second device and the first device, include corresponding hardware structures and/or software modules for performing the functions. A person skilled in the art should easily be aware that, in combination with example algorithms steps described in the embodiments disclosed in this specification, this application can be implemented by using hardware or a combination of hardware and computer software. Whether a function is performed by using hardware or by computer software driving hardware depends on particular applications and design constraints of the technical solutions. A person skilled in the art may use a different method to implement the described functions for each particular application, but it should not be considered that the implementation goes beyond the scope of this application.

In this embodiment of this application, functional modules of the first device and the second device may be obtained through division based on the foregoing method examples. For example, each functional module may be obtained through division in correspondence to each function, or at least two functions may be integrated into one processing module. The integrated module may be implemented in a form of hardware, or may be implemented in a form of a software functional module. It should be noted that, in this embodiment of this application, module division is an example and is merely logical function division. During actual implementation, there may be another division manner.

Figure 9:
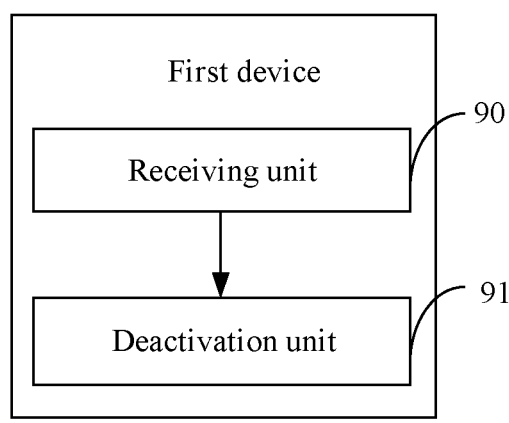
FIG. 9 is a schematic composition diagram of a first device according to an embodiment of this application.

When each functional module is obtained through division in correspondence to each function, FIG. 9 is a possible schematic composition diagram of a first device. The first device may be configured to perform functions of the first device in the foregoing embodiment. As shown in FIG. 9, the first device may include a receiving unit 90 and a deactivation unit 91.

The receiving unit 90 is configured to receive signaling sent by a second device, for example, configured to support the first device in performing step 302.

The deactivation unit 91 is configured to deactivate a BWP based on the signaling received by the receiving unit 90, for example, configured to support the first device in performing step 303.

It should be noted that all related content of each step in the foregoing method embodiments may be cited in function descriptions of a corresponding functional module. This is not elaborated herein again. The first device provided in this embodiment of this application is configured to perform the BWP deactivation method, and therefore can achieve an effect that is the same as the foregoing BWP deactivation method.

When an integrated unit is used, an embodiment of this application provides a communications apparatus. The apparatus is in a form of a chip, and is configured to perform functions of the first device in the foregoing embodiment. The apparatus may include a processing module and a communications module. The processing module is configured to perform control management on an action of the apparatus. For example, the processing module is configured to support the apparatus in performing step 303 and another process of the technology described in this specification. The communications module is configured to support the apparatus in communicating with another network entity, for example, support the apparatus in communicating with the functional modules or the network entity shown in FIG. 1, or performing step 302. The apparatus may further include a storage module, configured to store program code and data of the apparatus.

The processing module may be a processor or a controller. The processing module may implement or execute various example logical blocks, modules, and circuits described with reference to content disclosed in this application. Alternatively, the processor may be a combination implementing a computing function, for example, a combination including one or more microprocessors, or a combination of a DSP and a microprocessor. The communications module may be a transceiver circuit, a communications interface, or the like. The storage module may be a memory. When the processing module is a processor, a transmitter and a receiver are integrated into the communications module, and the storage module is a memory, the apparatus in this embodiment of this application may be the communications device shown in FIG. 2.

Figure 10:
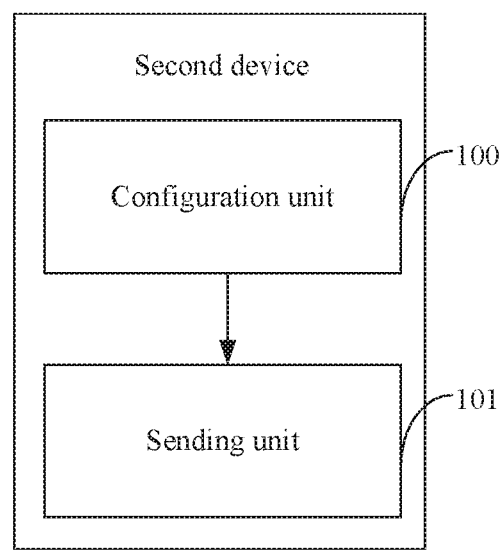
FIG. 10 is a schematic composition diagram of a second device according to an embodiment of this application.

When each functional module is obtained through division in correspondence to each function, FIG. 10 is a possible schematic composition diagram of a second device. The second device may be configured to perform functions of the second device in the foregoing embodiment. As shown in FIG. 10, the second device may include a configuration unit 100 and a sending unit 101.

The configuration unit 100 is configured to configure at least one BWP for a first device, for example, configured to support the second device in performing step 301.

The sending unit 101 is configured to send signaling to the first device, for example, configured to support the second device in performing step 302.

It should be noted that all related content of each step in the foregoing method embodiments may be cited in function descriptions of a corresponding functional module. This is not elaborated herein again. The second device provided in this embodiment of this application is configured to perform the BWP deactivation method, and therefore can achieve an effect that is the same as the foregoing BWP deactivation method.

When an integrated unit is used, an embodiment of this application provides a communications apparatus. The apparatus is in a form of a chip, and is configured to perform functions of the second device in the foregoing embodiment. The apparatus may include a processing module and a communications module. The processing module is configured to perform control management on an action of the apparatus. For example, the processing module is configured to support the apparatus in performing step 301 and another process of the technology described in this specification. The communications module is configured to support the apparatus in communicating with another network entity, for example, support the apparatus in communicating with the functional modules or the network entity shown in FIG. 1, or performing step 302. The apparatus may further include a storage module, configured to store program code and data of the apparatus.

The processing module may be a processor or a controller. The processing module may implement or execute various example logical blocks, modules, and circuits described with reference to content disclosed in this application. Alternatively, the processor may be a combination implementing a computing function, for example, a combination including one or more microprocessors, or a combination of a DSP and a microprocessor. The communications module may be a transceiver circuit, a communications interface, or the like. The storage module may be a memory. When the processing module is a processor, a transmitter and a receiver are integrated into the communications module, and the storage module is a memory, the apparatus in this embodiment of this application may be the communications device shown in FIG. 2.

The foregoing descriptions about implementations allow a person skilled in the art to clearly understand that, for the purpose of convenient and brief description, division of the foregoing functional modules is used as an example for description. In actual application, the foregoing functions can be allocated to different functional modules for implementation depending on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, the module or unit division is merely logical function division and may be other division during actual implementation. For example, a plurality of units or components may be combined or integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one position, or may be distributed on a plurality of different positions. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A bandwidth part (BWP) deactivation method implemented by a first device, wherein the BWP deactivation method comprises:
   supporting a plurality of active BWPs;
   receiving signaling from a second device;
   deactivating a first BWP of the plurality of active BWPs based on the signaling; and
   receiving configuration information from the second device, wherein the configuration information instructs the first device to deactivate at least one BWP of the plurality of active BWPs other than a second BWP based on priorities of the plurality of active BWPs or frequency spacings between the plurality of active BWPs and the second BWP until a capability of all of the plurality of active BWPs of the first device is within a capability of the first device.

2. The BWP deactivation method of claim 1, wherein the signaling comprises first indication information that instructs whether to perform BWP deactivation, and wherein the first BWP is a BWP on which the signaling is located when the first indication information instructs to perform the BWP deactivation.

3. The BWP deactivation method of claim 2, wherein the signaling further comprises second indication information, wherein the second indication information indicates a third BWP for data transmission, and wherein before deactivating the first BWP, the BWP deactivation method further comprises transmitting data on the third BWP.

4. The BWP deactivation method of claim 1, wherein the signaling comprises first indication information and second indication information, wherein the first indication information indicates that the signaling instructs to perform BWP deactivation, wherein the second indication information indicates the at least one BWP on which to perform the BWP deactivation, and wherein the BWP deactivation method further comprises deactivating the at least one BWP based on the second indication information.

5. The BWP deactivation method of claim 1, further comprising deactivating the first BWP based on a resource location occupied by the signaling.

6. The BWP deactivation method of claim 5, wherein the resource location occupied by the signaling is either a location of a control resource set in which the signaling is located or a location of a search space in which the signaling is located, and wherein the resource location occupied by the signaling has a correspondence with whether to deactivate the first BWP.

7. The BWP deactivation method of claim 5, further comprising:
receiving the signaling at a first resource location; and
deactivating the first BWP when the first resource location corresponds to BWP deactivation.

8. The BWP deactivation method of claim 1, further comprising deactivating the first BWP based on the signaling and the capability of the first device.

9. The BWP deactivation method of claim 8, wherein the signaling comprises indication information that instructs to activate the second BWP of the first device, and wherein the BWP deactivation method further comprises:
activating the second BWP based on the indication information; and
deactivating the at least one BWP of the plurality of active BWPs other than the second BWP when a capability of all of the plurality of active BWPs is beyond the capability of the first device.

10. The BWP deactivation method of claim 9, further comprising deactivating the at least one BWP based on at least one of an activation time of the plurality of active BWPs, bandwidth values of the plurality of active BWPs, or index numbers of the plurality of active BWPs.

11. The BWP deactivation method of claim 8, wherein the capability of the first device comprises a maximum quantity of BWPs supported by the first device or a maximum bandwidth supported by the first device.

12. A bandwidth part (BWP) deactivation method implemented by a second device, wherein the BWP deactivation method comprises:
configuring at least one BWP for a first device;
sending signaling to the first device, wherein the signaling instructs the first device to deactivate a first BWP of a plurality of active BWPs corresponding to the first device; and
sending configuration information to the first device, wherein the configuration information instructs the first device to deactivate at least one BWP of the plurality of active BWPs other than a second BWP based on priorities of the plurality of active BWPs or frequency spacings between the plurality of active BWPs and the second BWP until a capability of all of the plurality of active BWPs of the first device is within a capability of the first device.

13. The BWP deactivation method of claim 12, wherein the signaling comprises first indication information that instructs whether to perform BWP deactivation.

14. The BWP deactivation method of claim 13, wherein the signaling further comprises second indication information that indicates a second BWP for data transmission.

15. The BWP deactivation method of claim 12, wherein the signaling comprises first indication information and second indication information, wherein the first indication information indicates that the signaling instructs to deactivate BWP, and wherein the second indication information indicates the at least one BWP on which to perform the BWP deactivation.

16. The BWP deactivation method of claim 12, further comprising sending the signaling at a first resource location, wherein the first resource location is either a location of a control resource set in which the signaling is located or a location of a search space in which the signaling is located, and wherein the first resource location corresponds to BWP deactivation.

17. The BWP deactivation method of claim 12, wherein the configuration information further instructs the first device to deactivate the at least one BWP of the plurality of active BWPs other than the second BWP based on at least one type of an activation time of the plurality of active BWPs, bandwidth values of the plurality of active BWPs, or index numbers of the plurality of active BWPs.

18. A communications apparatus, comprising:
a processor; and
a memory coupled to the processor and storing instructions that, when executed by the processor, cause the communications apparatus to be configured to:
receive signaling from a second device, wherein the communications apparatus is configured to support a plurality of active bandwidth parts (BWPs);
deactivate a first BWP based on the signaling; and
receive configuration information from the second device, wherein the configuration information instructs the first device to deactivate at least one BWP of the plurality of active BWPs other than a second BWP based on priorities of the plurality of active BWPs or frequency spacings between the plurality of active BWPs and the second BWP until a capability of all of the plurality of active BWPs of the first device is within a capability of the first device.

19. The communications apparatus of claim 18, wherein the signaling comprises first indication information that instructs whether to perform BWP deactivation, and wherein the instructions further cause the communications apparatus to be configured to deactivate a BWP on which the signaling is located when the first indication information instructs to perform the BWP deactivation.

20. The communications apparatus of claim 19, wherein the signaling further comprises second indication information that indicates a third BWP for data transmission, and wherein before the communications apparatus deactivates the first BWP, the instructions further cause the communications apparatus to be configured to transmit data on the third BWP.

* * * * *

UNITED STATES PATENT AND TRADEMARK OFFICE
CERTIFICATE OF CORRECTION

PATENT NO. : 11,356,232 B2  
APPLICATION NO. : 16/961601  
DATED : June 7, 2022  
INVENTOR(S) : Xue et al.

Page 1 of 1

It is certified that error appears in the above-identified patent and that said Letters Patent is hereby corrected as shown below:

On the Title Page

Item (57), Line 1, should read: "A BWP deactivation method includes receiving, by a first device, signaling sent by a second device, and deactivating, by the first device, a BWP of the first device based on the signaling."

Signed and Sealed this  
Thirteenth Day of September, 2022

Katherine Kelly Vidal  
*Director of the United States Patent and Trademark Office*